United States Patent

Kissin et al.

[11] Patent Number: 6,153,551
[45] Date of Patent: Nov. 28, 2000

[54] PREPARATION OF SUPPORTED CATALYST USING TRIALKYLALUMINUM-METALLOCENE CONTACT PRODUCTS

[75] Inventors: Yuri V. Kissin, East Brunswick; Robert I. Mink, Warren; Thomas Edward Nowlin, Cranbury, all of N.J.

[73] Assignee: Mobil Oil Corporation, Fairfax, Va.

[21] Appl. No.: 08/892,592

[22] Filed: Jul. 14, 1997

[51] Int. Cl.$^7$ .............................. B01J 31/00; B01J 37/00; C08F 4/02; C08F 4/60
[52] U.S. Cl. .......................... 502/110; 502/103; 502/104; 502/117; 502/132
[58] Field of Search .................................. 502/103, 104, 502/110, 117, 132

[56] References Cited

U.S. PATENT DOCUMENTS

| | | |
|---|---|---|
| Re. 31,099 | 12/1982 | Scata et al. . |
| 2,827,446 | 3/1958 | Breslow . |
| 2,924,593 | 2/1960 | Breslow . |
| 3,013,002 | 12/1961 | Breslow et al. . |
| 3,051,690 | 8/1962 | Vandenberg . |
| 3,104,249 | 9/1963 | Clauss et al. . |
| 3,135,809 | 6/1964 | Bosmajian . |
| 3,152,105 | 10/1964 | Long . |
| 3,161,629 | 12/1964 | Gorsich et al. . |
| 3,184,416 | 5/1965 | Mottus . |
| 3,231,550 | 1/1966 | Manyik et al. . |
| 3,242,099 | 3/1966 | Manvik et al. ........................ 252/429 |
| 3,306,919 | 2/1967 | Brantley et al. . |
| 3,316,233 | 4/1967 | Feay . |
| 3,663,635 | 5/1972 | Lassau et al. . |
| 3,950,269 | 4/1976 | Setterquist ............................ 252/430 |
| 4,012,566 | 3/1977 | Zelinski et al. . |
| 4,125,567 | 11/1978 | Kidwell et al. . |
| 4,133,944 | 1/1979 | Cooper et al. . |
| 4,147,709 | 4/1979 | Lynch . |
| 4,151,186 | 4/1979 | Kidwell et al. . |
| 4,188,470 | 2/1980 | Collin et al. ............................ 526/64 |
| 4,197,419 | 4/1980 | Schrock . |

(List continued on next page.)

FOREIGN PATENT DOCUMENTS

| | | |
|---|---|---|
| 220436 | 2/1959 | Australia . |
| 1268753 | 5/1990 | Canada . |
| 2008315 | 7/1990 | Canada . |
| 0 020 818 | 1/1981 | European Pat. Off. . |
| 32734 | 7/1981 | European Pat. Off. . |
| 0 048 227 | 3/1982 | European Pat. Off. . |
| 129368 | 12/1984 | European Pat. Off. . |
| 0 141 597 | 5/1985 | European Pat. Off. . |
| 0 206 794 | 12/1986 | European Pat. Off. . |
| 0 230 753 | 8/1987 | European Pat. Off. . |
| 0260130 | 3/1988 | European Pat. Off. . |
| 287408 | 10/1988 | European Pat. Off. . |
| 0 298 700 | 1/1989 | European Pat. Off. . |
| 0313386 | 4/1989 | European Pat. Off. . |
| 0 341 091 | 11/1989 | European Pat. Off. . |
| 0 351 189 | 1/1990 | European Pat. Off. . |
| 351391 | 1/1990 | European Pat. Off. . |
| 0 516 458 | 4/1992 | European Pat. Off. . |
| 0 515 132 | 5/1992 | European Pat. Off. . |
| 2072484 | 8/1971 | France . |
| 2237911 | 2/1975 | France . |
| 1022382 | 1/1958 | Germany . |
| 2608863 | 9/1977 | Germany . |
| 2608933 | 9/1977 | Germany . |
| 3007433 | 9/1981 | Germany . |

(List continued on next page.)

OTHER PUBLICATIONS

"Dictionary of Chemistry." 133, 154, 212, 231. (Undated).
Hubery, J. "Periodic Table from Principles of Structure and Reacivity." in Inorganic Chemistry, Third Edition. (Undated).
Robinson, G. "Coordination Chemistry of Aluminum." in Robinson, G., ed., Clemson University. (Undated).
Wilkinson, G. "Bis–cyclopentadienyl Compounds Ti, Zr, V, Nb and Ta." J. Am. Chem. Soc. 76. (Sep. 5, 1994).
Taft. Jr., R. "Separation of Polar, Steric and Resonance Effects in Reactivity." in Newman, M., ed., Steric Effects in Organic Chemistry. New York: John Wiley & Sons, 524–675. (1956).
Breslow, D. and Nawberg, N. "Bis(cyclopentadienyl)–titanium Dichloride—Alkylaluminum Complexes as Catalysts for the Polymerization of Ethylene." J. Am. Chem. Doc. 79:17, 5072–5073. (Sep. 11, 1957).
Natta G. et al. "A Crystallizable Organometallic Complex containing Titanium and Aluminum." J. Am. Chem. Soc. 79, 2975–2976 (1957).
Natta G. et al. "Polimerizzazione dell'ettilene Catalizzata da Composti di Titanio." Chim. Ind. 39:7, 1032–1033 (1957).
Natta G. et al. "Complessi Cristallizzabili Contenenti Titanio e Alluminio Cataliticamente Attivi nella Polimerizzazione dell'etilene." J. Inorg. Nucl. Chem. 8, 612–618. (1958).
Breslow, D. and Newberg, N. "Bis–(cyclopentadienyl)–titanium Dichloride–Alkylaluminum Complexes as Soluble Catalysts for the Polymerization of Ethylene." J. Am. Chem. Soc. 81:1, 81–86. (Jan. 20, 1959).
Chien, J. "Kinetic of Ethylene Polymerization Catalyzed by Bis(cyclopentadienyl)–titanium Dichlorid–Dimethylalumnium Chloride." J. Am. Chem. Soc. 81:1, 86–92. (Jan. 20, 1996).
Eisch, J. et al. "Organometallic Compounds." in Emeieus, H. and Sharpe, A. eds., Advances in Inorganic Chemistry, vol. 2 New York: Academic Press, 61–103 (1960).
Karapinka, G. and Carrick, W. "Transition Metal Catalysts. VI. Bis–(cyclopentadienyl) Transition Metal Polymerization Catalysts." J. Polym. Sci. 55, 145–152. (1961).

(List continued on next page.)

Primary Examiner—Mark L. Bell
Assistant Examiner—J. Pasterczyk

[57] ABSTRACT

The supported catalyst disclosed herein is a contact product of two components. One component is the contact product of silica containing hydroxyl groups and alumoxane. This second component is the paraffinic-hydrocarbon soluble contact product of a metallocene compound of a transition metal and a trialkylaluminum compound.

11 Claims, No Drawings

U.S. PATENT DOCUMENTS

| | | | |
|---|---|---|---|
| 4,200,716 | 4/1980 | Pez . | |
| 4,205,021 | 5/1980 | Morita et al. . | |
| 4,243,619 | 1/1981 | Fraser et al. . | |
| 4,252,987 | 2/1981 | Godall et al. . | |
| 4,255,542 | 3/1981 | Brown et al. . | |
| 4,258,038 | 3/1981 | Strong . | |
| 4,265,949 | 5/1981 | Kugimiya . | |
| 4,269,738 | 5/1981 | Pez et al. . | |
| 4,299,936 | 11/1981 | Candlin et al. | 526/119 |
| 4,302,565 | 11/1981 | Geoke et al. . | |
| 4,310,648 | 1/1982 | Shipley et al. | 526/114 |
| 4,311,816 | 1/1982 | Mollison et al. . | |
| 4,324,691 | 4/1982 | Hartshorn et al. | 252/429 B |
| 4,329,252 | 5/1982 | Gavens et al. | 252/429 B |
| 4,338,424 | 7/1982 | Morita et al. | 526/65 |
| 4,356,111 | 10/1982 | Shipley et al. | 252/429 B |
| 4,359,561 | 11/1982 | Fraser et al. . | |
| 4,390,677 | 6/1983 | Karol et al. . | |
| 4,399,053 | 8/1983 | Shipley et al. | 252/429 B |
| 4,402,861 | 9/1983 | Hoff | 252/429 B |
| 4,404,344 | 9/1983 | Sinn et al. | 526/160 |
| 4,405,774 | 9/1983 | Miwa et al. . | |
| 4,410,750 | 10/1983 | Langer, Jr. . | |
| 4,418,114 | 11/1983 | Briggs et al. . | |
| 4,420,592 | 12/1983 | Kato et al. | 526/65 |
| 4,438,238 | 3/1984 | Fukushima et al. . | |
| 4,446,288 | 5/1984 | Hoff | 526/129 |
| 4,461,792 | 7/1984 | Anthony . | |
| 4,469,638 | 9/1984 | Bonnemann et al. . | |
| 4,478,988 | 10/1984 | Pullukat et al. . | |
| 4,505,970 | 3/1985 | Craver . | |
| 4,511,609 | 4/1985 | Craver et al. . | |
| 4,518,654 | 5/1985 | Eichbauer et al. . | |
| 4,518,751 | 5/1985 | Mizogami et al. | 526/114 |
| 4,522,982 | 6/1985 | Ewen . | |
| 4,525,257 | 6/1985 | Kurtz et al. . | |
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,536,549 | 8/1985 | Hattori et al. . | |
| 4,542,199 | 9/1985 | Kaminsky et al. | 526/160 |
| 4,544,762 | 10/1985 | Kaminsky et al. . | |
| 4,554,265 | 11/1985 | Graves | 502/113 |
| 4,556,719 | 12/1985 | Bonnemann et al. . | |
| 4,562,169 | 12/1985 | Hagerty . | |
| 4,563,659 | 1/1986 | Sakamoto . | |
| 4,564,647 | 1/1986 | Hayashi et al. . | |
| 4,568,659 | 2/1986 | Warzlhan et al. . | |
| 4,578,373 | 3/1986 | Graves | 502/113 |
| 4,588,650 | 5/1986 | Mientus et al. . | |
| 4,593,009 | 6/1986 | Nowlin . | |
| 4,605,638 | 8/1986 | Nowlin et al. . | |
| 4,618,660 | 10/1986 | Graves | 526/114 |
| 4,621,119 | 11/1986 | Lu . | |
| 4,626,574 | 12/1986 | Cancio et al. . | |
| 4,634,752 | 1/1987 | Hagerty et al. . | |
| 4,658,078 | 4/1987 | Slaugh et al. | 585/512 |
| 4,659,685 | 4/1987 | Coleman, III | 502/113 |
| 4,665,047 | 5/1987 | Slaugh et al. | 502/108 |
| 4,665,208 | 5/1987 | Welborn, Jr. et al. . | |
| 4,668,650 | 5/1987 | Lo et al. . | |
| 4,668,752 | 5/1987 | Tominari et al. . | |
| 4,692,496 | 9/1987 | Bahl et al. . | |
| 4,701,432 | 10/1987 | Welborn, Jr. | 502/113 |
| 4,703,094 | 10/1987 | Raufast | 526/65 |
| 4,705,829 | 11/1987 | Kwack et al. . | |
| 4,707,530 | 11/1987 | Johnson | 526/129 |
| 4,710,552 | 12/1987 | Bachl et al. | 526/116 |
| 4,716,201 | 12/1987 | Canterino et al. . | |
| 4,738,942 | 4/1988 | Nowlin . | |
| 4,752,597 | 6/1988 | Turner | 502/104 |
| 4,769,510 | 9/1988 | Kaminsky et al. | 585/512 |
| 4,786,678 | 11/1988 | Dobreski et al. . | |
| 4,791,180 | 12/1988 | Turner . | |
| 4,794,096 | 12/1988 | Ewen | 502/117 |
| 4,804,564 | 2/1989 | Dobreski et al. . | |
| 4,808,561 | 2/1989 | Welborn, Jr. | 502/104 |
| 4,814,540 | 3/1989 | Watanabe et al. | 585/523 |
| 4,820,557 | 4/1989 | Warren . | |
| 4,820,786 | 4/1989 | Bacskai | 526/152 |
| 4,824,912 | 4/1989 | Su . | |
| 4,826,920 | 5/1989 | Dobreski . | |
| 4,831,000 | 5/1989 | Miro et al. . | |
| 4,833,111 | 5/1989 | Nowlin . | |
| 4,849,389 | 7/1989 | Nowlin et al. . | |
| 4,851,478 | 7/1989 | Su . | |
| 4,857,611 | 8/1989 | Durand et al. . | |
| 4,871,704 | 10/1989 | Kohara et al. | 502/114 |
| 4,871,705 | 10/1989 | Hoel . | |
| 4,874,734 | 10/1989 | Kioka et al. | 502/104 |
| 4,876,229 | 10/1989 | Furtek . | |
| 4,876,320 | 10/1989 | Fulks et al. . | |
| 4,892,851 | 1/1990 | Ewen et al. . | |
| 4,897,455 | 1/1990 | Welborn, Jr. | 526/129 |
| 4,910,272 | 3/1990 | Marchand et al. | 526/129 |
| 4,912,075 | 3/1990 | Chang . | |
| 4,914,253 | 4/1990 | Chang | 585/523 |
| 4,918,038 | 4/1990 | Samuels et al. | 502/112 |
| 4,921,825 | 5/1990 | Kioka et al. . | |
| 4,921,911 | 5/1990 | Shirodkar . | |
| 4,923,833 | 5/1990 | Kioka et al. | 502/9 |
| 4,925,821 | 5/1990 | Chang | 502/107 |
| 4,929,681 | 5/1990 | Bahl et al. . | |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,935,474 | 6/1990 | Ewen et al. . | |
| 4,937,217 | 6/1990 | Chang | 502/111 |
| 4,937,299 | 6/1990 | Ewen et al. . | |
| 4,937,301 | 6/1990 | Chang | 526/128 |
| 4,939,217 | 7/1990 | Stricklen | 526/114 |
| 4,952,540 | 8/1990 | Kioka et al. | 502/9 |
| 4,957,972 | 9/1990 | Shirodkar . | |
| 4,962,248 | 10/1990 | Winter et al. | 585/12 |
| 4,962,262 | 10/1990 | Winter et al. | 585/512 |
| 4,972,033 | 11/1990 | Miro . | |
| 4,975,403 | 12/1990 | Ewen . | |
| 4,980,330 | 12/1990 | Marchand et al. | 502/115 |
| 4,981,760 | 1/1991 | Naito et al. . | |
| 4,985,498 | 1/1991 | Shirodkar . | |
| 5,001,205 | 3/1991 | Hoel | 526/128 |
| 5,001,244 | 3/1991 | Welborn . | |
| 5,006,398 | 4/1991 | Banerji . | |
| 5,006,500 | 4/1991 | Chang | 502/107 |
| 5,008,228 | 4/1991 | Chang | 502/111 |
| 5,017,665 | 5/1991 | Chang . | |
| 5,017,714 | 5/1991 | Welborn, Jr. . | |
| 5,019,315 | 5/1991 | Wilson . | |
| 5,021,382 | 6/1991 | Malpass, Jr. . | |
| 5,021,595 | 6/1991 | Datta | 556/42 |
| 5,023,388 | 6/1991 | Lüker | 585/9 |
| 5,025,072 | 6/1991 | Nowlin et al. . | |
| 5,026,797 | 6/1991 | Takahashi | 526/124 |
| 5,032,562 | 7/1991 | Lo et al. | 502/111 |
| 5,041,501 | 8/1991 | Shirodkar . | |
| 5,043,515 | 8/1991 | Slaugh et al. | 585/512 |
| 5,049,535 | 9/1991 | Resconi et al. | 502/117 |
| 5,051,481 | 9/1991 | Taka et al. . | |
| 5,055,438 | 10/1991 | Canich | 502/117 |
| 5,055,533 | 10/1991 | Allen et al. . | |
| 5,055,534 | 10/1991 | Theobald . | |
| 5,057,475 | 10/1991 | Canich et al. | 502/104 |

| | | | | | | | |
|---|---|---|---|---|---|---|---|
| 5,066,631 | 11/1991 | Sangokova et al. | 502/152 | 5,281,679 | 1/1994 | Jejelowo et al. | 526/114 |
| 5,077,255 | 12/1991 | Welborn, Jr. | 502/104 | 5,290,896 | 3/1994 | Kioka et al. . | |
| 5,082,817 | 1/1992 | Albizzati et al. | 502/102 | 5,296,434 | 3/1994 | Karl et al. . | |
| 5,084,534 | 1/1992 | Welborn, Jr. et al. . | | 5,296,580 | 3/1994 | Matsunaga et al. . | |
| 5,086,024 | 2/1992 | Crapo et al. | 502/117 | 5,304,523 | 4/1994 | Razavi | 502/152 |
| 5,086,025 | 2/1992 | Chang . | | 5,308,816 | 5/1994 | Tsutsui et al. | 502/108 |
| 5,086,133 | 2/1992 | Kissin | 526/151 | 5,314,973 | 5/1994 | Welborn . | |
| 5,087,788 | 2/1992 | Wu | 585/512 | 5,317,036 | 5/1994 | Brady, III et al. | 523/223 |
| 5,089,322 | 2/1992 | Matsunaga et al. . | | 5,321,107 | 6/1994 | Tsutsui et al. . | |
| 5,089,460 | 2/1992 | Chien . | | 5,322,728 | 6/1994 | Davey et al. . | |
| 5,091,228 | 2/1992 | Fujii et al. . | | 5,324,800 | 6/1994 | Welborn, Jr. et al. | 526/160 |
| 5,091,352 | 2/1992 | Kioka et al. | 502/103 | 5,324,805 | 6/1994 | Kioka et al. . | |
| 5,093,295 | 3/1992 | Tomotsu et al. . | | 5,329,033 | 7/1994 | Spaleck et al. | 556/53 |
| 5,096,867 | 3/1992 | Canich . | | 5,332,706 | 7/1994 | Nowlin et al. | 502/107 |
| 5,102,841 | 4/1992 | Cann . | | 5,334,714 | 8/1994 | Oguchi . | |
| 5,106,804 | 4/1992 | Bailly et al. . | | 5,340,786 | 8/1994 | Tsutsui et al. | 502/117 |
| 5,114,763 | 5/1992 | Brant et al. . | | 5,346,732 | 9/1994 | Lai et al. . | |
| 5,120,696 | 6/1992 | Tsutsui et al. | 502/113 | 5,347,025 | 9/1994 | Yamada et al. | 556/11 |
| 5,122,491 | 6/1992 | Kioka et al. | 502/117 | 5,348,926 | 9/1994 | Yamada et al. | 502/117 |
| 5,126,301 | 6/1992 | Tsutsui et al. | 502/108 | 5,350,817 | 9/1994 | Winter et al. | 526/119 |
| 5,126,303 | 6/1992 | Resconi et al. | 502/117 | 5,358,792 | 10/1994 | Mehta et al. . | |
| 5,132,262 | 7/1992 | Rieger et al. | 502/117 | 5,359,015 | 10/1994 | Jejelowo | 526/114 |
| 5,132,381 | 7/1992 | Winter et al. | 526/160 | 5,362,824 | 11/1994 | Furtek . | |
| 5,145,819 | 9/1992 | Winter et al. | 502/117 | 5,372,682 | 12/1994 | Devore et al. | 204/72 |
| 5,147,936 | 9/1992 | Peszkin et al. . | | 5,373,072 | 12/1994 | Chang | 526/129 |
| 5,147,949 | 9/1992 | Chang | 526/129 | 5,374,700 | 12/1994 | Tsutsui et al. | 526/348.3 |
| 5,157,008 | 10/1992 | Sangokova et al. | 502/111 | 5,382,630 | 1/1995 | Stehling et al. . | |
| 5,162,278 | 11/1992 | Razavi | 502/152 | 5,383,877 | 1/1995 | Fujita et al. | 502/103 |
| 5,171,071 | 12/1992 | Takata et al. . | | 5,384,298 | 1/1995 | Inahara et al. | 502/104 |
| 5,171,799 | 12/1992 | Kioka et al. | 26/127 | 5,395,810 | 3/1995 | Shamshoum et al. | 502/113 |
| 5,171,871 | 12/1992 | Mivashita | 556/27 | 5,399,636 | 3/1995 | Alt et al. | 526/129 |
| 5,171,919 | 12/1992 | Watanabe et al. | 585/523 | 5,405,922 | 4/1995 | DeChellis et al. . | |
| 5,173,343 | 12/1992 | Arvedson et al. . | | 5,409,874 | 4/1995 | Imuta et al. | 502/103 |
| 5,173,464 | 12/1992 | Pettijohn et al. | 502/104 | 5,412,131 | 5/1995 | Sangokova | 556/175 |
| 5,182,244 | 1/1993 | Pettijohn | 502/110 | 5,416,053 | 5/1995 | Bai et al. | 502/128 |
| 5,187,250 | 2/1993 | Asanuma et al. . | | 5,416,178 | 5/1995 | Winter et al. | 526/160 |
| 5,189,000 | 2/1993 | Masi et al. | 502/113 | 5,416,179 | 5/1995 | Welch et al. | 526/160 |
| 5,196,496 | 3/1993 | Galimberti et al. | 526/348.6 | 5,420,220 | 5/1995 | Cheruvu et al. . | |
| 5,198,399 | 3/1993 | Hoff et al. | 502/111 | 5,422,325 | 6/1995 | Jejelowo et al. | 502/104 |
| 5,202,398 | 4/1993 | Antberg . | | 5,434,116 | 7/1995 | Sone et al. | 502/103 |
| 5,204,419 | 4/1993 | Tsutsui et al. . | | 5,436,305 | 7/1995 | Alt et al. | 526/160 |
| 5,206,075 | 4/1993 | Hodgson, Jr. . | | 5,439,995 | 8/1995 | Bailly et al. . | |
| 5,206,197 | 4/1993 | Campbell, Jr. | 502/103 | 5,441,920 | 8/1995 | Welborn, Jr. . | |
| 5,206,199 | 4/1993 | Kioka et al. | 502/117 | 5,444,145 | 8/1995 | Brant et al. . | |
| 5,208,304 | 5/1993 | Waymouth | 526/164 | 5,451,649 | 9/1995 | Zenk et al. | 526/160 |
| 5,210,167 | 5/1993 | Firdaus et al. . | | 5,453,475 | 9/1995 | Rieger et al. | 526/160 |
| 5,216,095 | 6/1993 | Dolle et al. | 526/127 | 5,455,316 | 10/1995 | Tsutsui et al. | 526/114 |
| 5,218,071 | 6/1993 | Tsutsui et al. . | | 5,455,365 | 10/1995 | Winter et al. | 556/7 |
| 5,218,250 | 6/1993 | Nakagawa . | | 5,459,217 | 10/1995 | Todo et al. | 526/348.1 |
| 5,223,465 | 6/1993 | Ueki et al. | 502/117 | 5,466,649 | 11/1995 | Jejelowo | 502/120 |
| 5,225,500 | 7/1993 | Elder et al. | 526/127 | 5,473,028 | 12/1995 | Nowlin et al. | 526/114 |
| 5,227,440 | 7/1993 | Canich et al. . | | 5,476,914 | 12/1995 | Ewen et al. . | |
| 5,231,151 | 7/1993 | Spencer . | | 5,525,678 | 6/1996 | Mink et al. | 525/246 |
| 5,234,731 | 8/1993 | Ferguson . | | 5,554,704 | 9/1996 | Burkhardt et al. . | |
| 5,234,878 | 8/1993 | Tsutsui et al. | 502/103 | 5,559,885 | 9/1996 | Drexler et al. . | |
| 5,238,891 | 8/1993 | Miro | 502/104 | 5,608,019 | 3/1997 | Cheruvu . | |
| 5,238,892 | 8/1993 | Chang | 502/111 | 5,633,394 | 5/1997 | Welborn, Jr. et al. . | |
| 5,240,894 | 8/1993 | Burkhardt et al. | 502/108 | 5,703,180 | 12/1997 | Tsutsui et al. | 526/119 |
| 5,241,025 | 8/1993 | Hlatkv et al. | 526/129 | 5,795,838 | 8/1998 | Tsutsui et al. | 502/103 |
| 5,242,876 | 9/1993 | Shamshoum et al. | 502/113 | 5,795,839 | 8/1998 | Kataoka et al. | 502/126 |
| 5,252,529 | 10/1993 | Ueda . | | | | | |
| 5,254,517 | 10/1993 | Shamsoum et al. . | | | | | |
| 5,258,342 | 11/1993 | Luciani et al. | 502/107 | | | | |
| 5,258,463 | 11/1993 | Evans et al. . | | | | | |
| 5,260,244 | 11/1993 | Pettijohn | 502/115 | | | | |
| 5,260,382 | 11/1993 | Kohyama et al. . | | | | | |
| 5,262,228 | 11/1993 | Kohyama et al. . | | | | | |
| 5,266,392 | 11/1993 | Land . | | | | | |
| 5,266,544 | 11/1993 | Tsutsui et al. . | | | | | |
| 5,272,236 | 12/1993 | Lai et al. . | | | | | |
| 5,278,117 | 1/1994 | Luciani et al. | 502/113 | | | | |
| 5,279,999 | 1/1994 | DeBoer et al. . | | | | | |

FOREIGN PATENT DOCUMENTS

| | | |
|---|---|---|
| 3007725 | 9/1981 | Germany . |
| 4-85306 | 7/1990 | Japan . |
| 462473 | 3/1976 | Russian Federation . |
| 462389 | 6/1977 | Russian Federation . |
| 209746 | 1/1988 | Russian Federation . |
| 1319746 | 6/1973 | United Kingdom . |
| 2 034 723 | 6/1980 | United Kingdom . |
| 2 125 417 | 3/1984 | United Kingdom . |
| WO 93/03093 | 2/1993 | WIPO . |
| WO 94/14855 | 7/1994 | WIPO . |

| | | |
|---|---|---|
| WO 94/14856 | 7/1994 | WIPO . |
| WO 94/21691 | 9/1994 | WIPO . |
| WO 94/26793 | 11/1994 | WIPO . |
| WO 94/26816 | 11/1994 | WIPO . |
| WO 95/11263 | 4/1995 | WIPO . |
| WO 95/13305 | 5/1995 | WIPO . |
| WO 95/13306 | 5/1995 | WIPO . |
| WO 95/13871 | 5/1995 | WIPO . |
| WO 95/26372 | 10/1995 | WIPO . |
| PCT/US98/ 13690 | 7/1998 | WIPO . |

OTHER PUBLICATIONS

Marconi, W. et al. "Polimerizzazioni di Mono– e Idi–olefine Catalizzate da Indenil–Derivati del Titanio in Unione con Metallo–Alchili." Chim. Ind. 44:3, 235–240. (1962).

Marconi, W. et al. "Polimerizzazione Stereospcifica dell'isoprene con Calicio–zinco–alchili de Sali de Titanio." Chim. Ind. 44:2, 121–126. (1962).

Marconi, W. et al. "Sintesi di Bis–Indenil Derivati del Titanio e loro Complessi con gli Alluminion Alchili." Chim. Ind. 44:3, 229–234. (1962).

Chien, J. "Olefin Polymerization and Polyolefin Molecular Weight Distribution." J. Polym. Sci. Part A 1:6, 1839–1856. (1963).

Sinn, H. and Patat, F. "Uber die Wirkungsweise Mettalorganischer Katalysatoren." Angew. Chem. 75:18, 805–813. (1963).

Sakharovskaya, G. et al. Zh. Obsch. Chim. (Russian Journal of General Chemistry) 39, 788–795. (1964).

King, R. "Organometallic Syntheses, vol. 1, Transition–Metal Compounds." New York: Academic Press, 63–81. (1965).

Samuel, E. and Setton, R. "Zirconium and Titanium Derivatives of Indene and Fluorene." J. Organomet. Chem. 4, 156–158. (1965).

Sinn, H. and Oppermann, G. "Chloro(dicyclopentadienyl) ethylzirconium and its Reaction with Triethylaluminum." Angew. Chem. Int. Ed. Engl. 5:11, 962–963. (1966).

Sinn, H. and Kolk, E. "Über das Auftreten einer Struktur ZrIV –CH2–CH2–ZrIV bei der Umsetzung von Dicyclopentadienylzizrkondichlorid mt Triäthylaluminium." J. Organomet. Chem. 6:4, 373–382. (Oct. 1966).

Dyachovskii, F.S. "The Role of Free Ions in Reactions of Olefins with Soluble Complex Catalysts." J. Pol. Sci. C:16, 2333–2339. (1967).

Eisch, J. "Organometallic Compound." McGraw Hill Yearbook Science and Technology New York: McGraw Hill, 277–279. (1967).

Eisch, J. "The Chemistry of Organometallic Compounds." New York: Macmillan Company, 1–178. (1967).

Henrici–Olive, G. and Olive, S. "The Active Species in Homogeneous Ziegler–Natta Catalysts for the Polymerization of Ethylene." Angew. Chem. Int. Ed. Engl., 6:1, 790–798. (1967).

Durrksen, J. and Hamielec, A. "Polymer Reactors and Molecular Weight Distribution. Part III. Gel Permeation Chromatography, Methods of Correcting for Imperfect Resolution." J. Polymer Sci.: Part C 21, 83–103. (1968).

Durrksen, J. and Hamielec, A. "Polymer reactors and Molecular Distribution. VII. Further Development of gel Permeation Chromatography." J. Appl. Polymer Sci. 12:7, 2255. (Jul. 1968).

Eisch, J. and Foxton, M. "Aluminum. Annual Survey Covering The Year 1967." Organomet. Chem. Rev. B 4:2 308–330. (1968).

Eisch, J. "Organometallic Principles in Modern Organic Synthesis." American Chemical Society Short Course Lecture Series 24 1–24. (1968).

Metzger, J. "Elecktronenabsorptionsspektren von Bis(n–cyclopentadienyl)–titan(IV)–Verbindungen." Diplomarbeit, Unversitat Hamburg, 1–30. (1968).

Balke, S. et al. "Gel Permeation Chromatography. Calibration Curve from Polydisperse Standards." Industrial Engineering Chemistry Product Research & Development, 8:1, 54–57. (Mar. 1969).

Balke, S. et al. "Polymer Reactors and molecular Weight Distribution. VIII. A Method of Interpreting Skewed GPC Chromatograms." J. Appl. Poly. Sci. 13:7, 1381–1420. (1969).

Eisch, J. "Aluminum. Annual Survey Covering the Year of 1968." Organomet. Chem. Rev. B 5, 85–116. (1969).

Grant, J. "Hackh's Chemical Dictionary." McGraw–Hill. (1969).

Sakharovskaya, G. et al. ZH. Obsch. Chim. (Russian Journal of General Chemistry) 39, 788–795. (1969).

Eisch, J. "Aluminum. Annual Survey Covering the Year 1969." Organomet. Chem. Rev B 6, 400–435. (1970).

Eisch, J. "The Chemistry of Organometallic Compounds: The Main Group Elements. Japanese ed." Tokyo: Hirokawa Publishing Co., 1–200. (1970).

Heins, E. et al. "Beispiele fur die Kondensation von Metallalkylen unter Alkanabspaltung." Makromol. Chem. 134:1, 1–22. (1970).

Katz, T. and Acron, N. "1,1'–Methylenetitanocene Dichloride." Tetradedron Letters 28, 2497–2499. (1970).

Matkovskii, P. et al. " Copolymerization of Ethylene with butylene on Soluble. Catalytic System (C5H5)2TiCl2— (C2H5)2AlCl." Vysokomol. Soed. (Russian J. Pol. Sci.). Al2:10, 2286–2296. (1970).

Billmeyer, F. Jr. Textbook of Polymer Science, 2nd ed. New York: Wiley Interscience, 1–598. (1971).

Chien, J. "A study of Surface Structures of Submicron Metal Oxides by Vanadium Tetrachloride as a Paramagnetic Probe." J. Am. Chem. Soc. 93:19, 4675–4684. (Sep. 22, 1971).

Chien, J. "Reduction of Ti(IV) Alkyls in Cab–O–Sil Surfaces." J. Catalysis 23, 71–80. (1971).

Davis, B. and Bernal, I. " The Crystal and Molecular Structure of (1,1'–Trimethylenedicyclopentadienyl)titanium Dichloride." J. Organometal. Chem. 30, 75–87. (1971).

Höcker, H. and Salki, K. "Polymerisation of Ethylene with soluble Ziegler–Natta Catalysts." Makromol. Chem. 148, 107–118. (Oct. 8, 1971).

Kaminsky, W. "Die Reaktion zwischen Bis(cyclopentadienyl)–zirkon–dichlorid und Aluminiumtriathyl." Ph.D. Dissertation, Universitat Hambur, 1–246. (1971).

Metzger, J. "Uber die Reduktion von Ubergangsmetallhalogeniden durch Aluminiumalkyle." Dissertation, Universitat Hamburg, 1–77+ Appendices. (1971).

Belov, G. et al. "Copolymerization of Ethylene with Propylene of a Soluble Catalytic System (C5H5)2TiCl2— Al(C2H5)2Cl in an Ethyl Chloride." Polym. J. 3:6, 681–689. (1972).

Hillman, M. and Weiss, A. "1,1'–Trimethylenetitanocene Dichloride and the Corresponding Compounds of Zirconium and Hafnium." J. Organometal. Chem. 42, 123–128. (1972).

Borisova, L. et al. "Polymerization of Ethylene with the System (C5H5)2TiEtCl—AlEtCl2." Eurp. Polym. J. 9:9, 953–963. (1973).

Reichert, K. and Meyer, K. "Zur Kinetik der Nierderdruckpolymerisation von Äthylen mit L–slichen Ziegler–Katalysatoren." MaKromol. Chem. 169, 163–176. (Jul. 24, 1973).

Samuel, E. and Rausch, M. "–Cyclopentadienyl and –Idenyl Compounds of Titanium, Zirconium, and Hafnium Containing Bonded Organic Substituents." J. Am. Chem. Soc. 95:19, 6263–6267. (1973).

Hemyama, N. et al. "Bis(dialkylaluminum) Oxide from Lithium Dialkylaluminates and Dialkylaluminum Chlorides 1,2." Inorganic Chemistry 12:10, 2218–2225. (1973).

Volkov, L. et al."Study of Aluminoxane Activating Abitilty in Butadiene–1, 3 Polymerization." Vysokomol. Soed. (Russian Journal of Polymer Science) B15:6, 455–457. (1973).

Benfield, F., Cooper, N., and Green, M. "Alkyl–Olefin Derivatives of Molybdenum and tungsten." J. of Organometal. Chem. 76, 49–56. (1974).

Kaminsky, W. et al. "Note on the X–Ray Structure Analysis of Al, Zr–u–Chloro–1–[bis(cyclopentadienylzirconio(IV)] 13 2,2–bis(diethylaluminio) ethane." Liebigs Ann. Chem. 1531–1533. (1974).

Kaminsky, W. et al. "Die Bilding von Dimetalloalkylenen, eine Unvermeidliche Nebenreaktion Homogener Ziegler–Katalysatoren." Die Makromol. Chem. 175, 443–456. (1974).

Köpz, H. and Kahl, W. "Metallorganische Polychalkogenid–Chelate VIII. IVA–Elementverbruckte Metallocenophane'." J. Organometal. Chem. 64, C37–C40. (1974).

Kowala, C. et al. "The Crystal and Molecular Structure of (1–5—Fluorenyl)(1–3–Fluorenyl) dichlorozirconium(iv)." J. of the Chemical Society, Chemical Communications 23, 993–994. (Dec. 4, 1974).

Saldarriaga–Molina, C. et al. "Structural Studies of (p–C5H5)2 MX2 Complexes and their Derivatives. Structure of (1,1'—Trimethylene–p–dicyclopentadienyl)hafnium Dichloride." Inorg. Chem. 13, 2880. (1974).

Waites, P. et al. "Chapter V. Complexes of Titanium and Aluminum (Including Related systems). E. The role of Organotitanium in Olefin Polymerization (Ziegler–Natta Catalysis." Organometallic Chemistry of titanium, Zirconium, and Hafnium. Academic Press: New York. 187–195. (1974).

Brikenshtein, K. et al. "Polymerization of Ethylene on the Di(cyclopentadienyl)Titanium Dichloride–dialkylaluminum Chloride System in Ethyl Chloride in a Continuous–operation Apparatus." Plast. Massy, 3, 6–8. (1975).

Chien, J. and Hsieh, J. "Support Ziegler–Natta Catalysts." in Chien, J.C.W., ed. in Coordination Polymerization—A Memorial to Karl Ziegler New York: Academic Press. 305–325. (1975).

Kaminsky, W. and Sinn, H. "Mehrfach durch Metalle substuierte Athane." Liebigs Ann. Chem. 424–437. (1975).

Kaminsky, W. and Vollmer, H. "Kernresonanzspektrokopische Untersuchungen an den Systemen Dicyclopentakienylzirkon(IV) und Organoaluminium." Liebigs Ann. Chem. 438–448. (1975).

Long, W. and Breslow, D. "Der Einfluss von Wasser auf die Katalytische Akitivität von Bis(p–cyclopentadienyl)titandichlorid–Dimethylaluminiumchlorid zur Polymerisation von Äthylen." Liebigs Ann. Chem. 463–469. (1975).

Mottweiler, R. "Untersuchung der Reaktionen von Bis(cyclopentadienyl)titan(IV–Verbindungen mit Aluminiumalkylen, auch in Gegenwart von Äthylen." Ph.D. Dissertation, Universität Hamburg, 1–141.

Andresen, A. et al. "Halogenfrei losliche Ziegler–Katalysatoren fur die Ethylen–Polymerisation. Regelung des Molekularge–wichtes duch Wahl der Reaktionstemperatur." Angew. Chem. 15:10, 630–632. (1976).

Kaminsky, W. et al. "Extreme Bond Angle Distortion in Organozirconium Compounds Active Toward Ethylene." Angew. Chem. Int. Ed. Engl., 15:10, 629–630. (1976).

Lauher, J. and Hoggman, R. "Structure and Chemistry of Bis(cyclopentadienyl)–MLn Complexes." J. Am. Chem. Soc. 98, 1729. (1976).

Polyakov, Z. et al."Method for Producing Polyolefins." Otkryt. Izobret. prom. Obraztsy Tovarnue Znaki, 53:10, 172 (1976).

Caunt, A. "Chapter 7, Ziegler Polymerization." in Kemball, C., ed., Catalysis, vol. 1. London: The Chemical Society, 234–276. (1977).

Chien, J. and Hsieh, J. "Supported Catalysts for Stereospecific Polymerization of Propylene." J. Polym. Sci.: Polym. Chem. Ed. 14:8, 1915–1932. (Aug. 1976).

"Gmelin Handbuch der Anorganischen Chemie. Ergänzungswerk zur achten Auflage. Band 40. Titan–Orgnaishce Verbindungen, Teil 1: Einkernige Berbindungen, Teil 1." Berlin: Springer–Verlag, 1–212. (1977).

Lau, C. and Brukaker, C. "Polymer–Supported Metallocenes and Their Applications to the Catalysis of Olefin isomerization, Olgomerization and Hydroformylation Reactions." American Chemical Society,, Symposium on Refining of Synthetic Crudes, 22 1184–1192. (1977).

Meskove, I. et al."Alkyl/Alumino Oxane as Cocatalysts in Ehtylene Polymerization." Vysokomol. Soedin. Ser B19:11, 849–852. (1977).

Thomas, S. "Chapter 1. Catalysis on Well–defined Metal Surfacea and Non–metallic Substrates." in Kemball, C., ed., Catalysis, vol. 1. London: The Chemical Society, 1–436. (1977).

Threlkel, R. and Bercaw, J. "A Convenient Synthesis of Alkyltetramethylcyclopentadienes and Phenyltertramethycyclopentadiene." J. Organomet. Chem. 136:1, 1–5. (Aug. 16, 1977).

Ballard, D. et al. "Alkyl Bridged Complexes of the Group 3A and Lanthanoid metals as Homogeneous Ethylene Polymerisation Catalysts." J.C.S. Chem. Comm. 1978, 994–9954. (1978).

Cihlar, J. et al. "Influence of Water on Ethylene Polymerization catalyzed by Titanocene Systems." Makromol. Chem. 179:9, 2553–2558. (Sep. 5, 1978).

Hamielec, A. and Ouano, A. "Generalized Universal Molecular Weight Calibration Parameter in GPC." J. Liquid Chromatography 1, 111–120. (1978).

Manriguez, J. "Solution Structure and Dynamics of Binuclear Dinitrogen Complexes of Bis(pentamethycyclopentadienyl) titanium (II) and Bis(pentamethycyclopentadienyl)zirconium (II)." J. Am. Chem. Soc. 100:10 3078–3083. (1978).

Ranault, P. "Chlorures de Mono– et Dialkyl–Zirconocene et—Hafnocene." J. Organometal. Chem. 64, 148, 35–42. (1978).

Tebbe, F. "Olefin Homologation with Titanium Methylene Compounds." J. Am. Chem. Soc. 100:10, 3611–3613. (1978).

Woldt, R. "Quantitative Untersuchungen der Reaktion von 1–[Triscyclopentadienyl–zircon[–2–[bis(diethyl–alumino)]–ethan mit Ethen sowie anderen Alkenen." Diplomarbeit, Universität Hamburg, 1–72 + Appendices (1978).

Boor, J. Jr. "Chapter 4. Chemical Descriptions of Ziegler–Natta Catalysts for Olefins." Zeigler–Natta Catalysts and Polymerizations. New York: Academic Press, 80–129. (1979).

Boor, J. Jr. "Chapter 6. Initial Physical State of the Catalyst." Ziegler–Natta Catalysts and Polymerizations. New York: Academic Press, 154–167. (1979).

Boor, J. Jr. "Chapter 7. Physical State of the Polymer During Polymerization." Ziegler–Natta Catalysts and Polymerizations. New York: Academic Press, 168–179. (1979).

Boor, J. Jr. "Chapter 9. Modification of Ziegler–Natta Catalysts by Third Components." Ziegler–Natta Catalysts and Polymerizations. New York: Academic Press, 213–243. (1979).

Boor, J. Jr. "Chapter 19. Polymerization of Monomers." Ziegler–Natta Catalysts and Polymerizations. New York: Academic Press, 512–562. (1979).

Chien, J. "New Supported Catalysts for Stereoregular Polymerization of a–Olefins." in Lenz, R. and Ciardelli, F., eds., Preparation and Properties of Stereoregular Polymers. Dordrecht, holland: Reidel Publishing Co., 113–130. (1979).

Iler, R. "Chapter 6. the Surface Chemistry of Silica." in The Chemistry of Silica: Solubility, Polymerization, Colloid and Surface Properties, and Biochemistry. New York: John Wiley & Sons, 622–729. (1979).

Schnutenhaus, H. et al. "1,1'–Trimethylen–bis (5–3–tert–butylcyclopentadienyl)–titan(IV)–dichlorid, ein chirales ansa–titanocen–Derivat." Angew. Chem. 91:10. (Oct. 1979).

Smith, J. et al. "ansa–Metallocene Derivatives molecular Structure and Proton Magnetic Resonance Spectra of Methylene–and Ethylene–Bridged Dicyclopentadientlitanium Compounds." J. Organometal. Chem. 173, 175–185. (1979).

Tait, P. "Chapter 3. Ziegler–Natta and Related Catalysts." in Haward, R., Developments on Polymerization–2. London: Applied Science Publishers, Ltd., 81–148. (1979).

Tebbe, F. et al. "Titanium–Catalyzed Olefin Methatesis." J. Am. Chem. Soc. 101, 5074–5075. (1979).

Ushakova, T. "Polyalkyl Alumoxanes and Their Uses as Vanadium Catalyst Carriers for Olefin Polymerization." Vysokomol. Soed. (Russian J. Pol. Sci.) A21, 2713. (1979).

Vollmer, H. "Reaktionen von Cyclopentadienyl–zircon–Verbindungen mit Aluminiumtrialkylen—Ligandenaustausch, Wasser-stoffübergang und Olefininsertion." Ph.D. Dissertation, Universität Hamburg, 1–308. (1979).

Bercaw, J. "Oxidative Addition and Reductive Elimination of Carbon–Hydrogen Bonds for Alkyl, Olefin, and Hydride Derivatives of Group IV Metallocenes." Preprints Symposia (Symposium on Homogeneous Catalysis, Mar. 23, 1980, Houston, Texas) 25:2, 396–398. (1980).

Cihlar, J. et al. "Polymerization of Ethylene Catalyzed by Titanocene Systems 1. Catalytic Systems Cp2TiEtCl/AlEtCl2 and Cp2TiEtCl/AlEtCl2 + H2O)." Makromol. Chem., Makromol. Chem. Phys. 181:12, 2549–2561. (1980).

Cotton, F. and Wilkinson, G. "Periodic Table from Advanced Inorganic Chemistry. A Comprehensive Text." John Wiley & Sons, 4th ed. (1980).

Couteurier, S. et al. "Synthese et Reactivite de Nouveaus Dihydrurozirconocenes et–Hafnocenes Substitutes Achiraus et Chiraux." J. Organometal. Chem. 195, 291–306. (1980).

Davis, J. et al. "The Proton and Carbon NMR Spectra of Alkyl–Substituted Titanocene and Zirconodcene Dichlorides." J. Magnetic Res. 37, 441–448. (1980).

Kaminsky, W. et al. "Polymerisation and Co–polymerisation of a–Olefines with Soluble Ziegler–Natta Catalysts of Extremely High Activity." IUPAC Macro Florence 3, 1–4. 5(1980).

Kopz, J. et al. "Al,Zr–m–Chloro–1– [Dicyclopentadienylzirconio(IV)–2–2–Bis(diethylalumino) Ethane, C20H33Al2ClZr." Cryst. Struc. Comm. 9, 197–201. (1980).

Kopz, J. et al. "Al,Zr–m–Chloro–1–Hydrido–(Triethyl alumino)–[Tri(cyclopentadienyl) zirconium(IV)]C21H31 AlZr." Cryst. Struc. Comm. 9, 985–990. (1980).

Kopz, J. et al. "Di–h5–cyclopendienyl)–2,2– Bis(Diethyla lumino)ethyl–zirconium–cyclopentadienide, C25H38Al2 Zr." Cryst. Struc. Comm. 9, 271–276. (1980).

Pein, J. "Untersuchengen von Systemen aus Cyclopentadienylzirkon(IV)–Verbindungen min n–Propylaluminium–Verbindungen." Ph.D. Dissertation, Universität Hamburg, 1–212. (1980).

Sinn, H. et al. "Living Polymer's on Polymerization with Extremely Productive Ziegler–Catalysts." Angew. Chem. Int. Ed. Engl. 19:5, 390–392. (1980).

Sinn, H. et al. "Ziegler–Natta Catalysis." in Stone, F. and West, R., eds., Advances in Organometallic Chemistry vol. 18, New York: Academic Press, 99–149. (1980).

Slotfeldt–Ellingsen, D. et al. "Heterogenization of Homogeneous Catalysts I. EPR Study of (h–C5H5)2TiCl2/(C2H5)hAlCl3–h(n=1,2,3) Supported on Silica Gel." J. Molec. Cata. 9, 423–434. (1980).

Tait, P. "Chapter 2. Part I. Co–ordination Complex Polymerization." in Jenkins, A. and Kennedy, J., eds. Macromolecular Chemistry. vol. 1. London: Royal Society of Chemistry. 3–21. (1980).

Ushakova, T. et al. "Polyalkyl Alumoxanes and their Uses as Vanadium Catalyst Carriers for Olefin Polymerizations." Polym. Sci. USSR 21:12, 1979, 2996–3001. (Nov. 1980).

Adam, G., and Green, M. "Bis(h–Alkylcyclopentadienyl)–Molybdenum and – Tungsten Chemistry: Mixed Valence, Ambidentate Tetraoxo– and Tetrathio–Molybdato and – Tungstato Derivatives, and Related Dihydrido and Dichloro Compounds." J. of Organometal. Chem. 208, 299–308. (1981).

Cihlar, J. et al. "Polymerization of Ethylene Catalyzed by Titanocene Systems, 2. Catalytic Systems Cp2 TiRCl/Oxyaluminum Compounds." Makromol. Chem. 182:4, 1127–1134. (1981).

Eisch, J. "Part I. Experimental techniques in the Organometallic chemistry of Nontransition Metals." Organometallic Syntheses, vol. 2. Nontransition Metal Compounds. New York: Academic Press, 3–80. (1981).

Fink, G. and Rottler, R. "Ethyleninsertion durch Lösliche Ziegler–Katalysatoren." Angew. Makromol. Chem. 94, 25–47. (Mar. 20, 1981).

Fink, G. et al. "Die Primärkomplexbildung in Löslichen Ziegler-Katalysatorsystemen: Kinetische und Thermodynamische Daten durch Dynamische 13C–NMR–Spektroskopie." Angew. Makromol. Chem. 96, 1–20. (May 20, 1981).

Kaminsky, W. "Neues über Ziegler–Natta–Katalyse." Makromol. Chem. (1981).

Kaminsky, W. "Transition Metal Catalyzed Polymerization Alkenes and Dienes." MMI Press Symposium Series. Part A, 4. (1981).

Klouras, N. and Köpz, H. "Ringsubstituierte [1]titanocenophane." Montash. Chemie. 112, 887–897. (1981).

Köpz–Mair, P. et al. "Antitumor Activity of Metallocenes: Ringsubstituted and Bridged titanocene–Dichloride." Eur. J. Med. Chem. 16, 275–281. (May–Jun. 1981).

Külper, K. "Studies on Homogeneous, Chlorine–Containing Ziegle Catalysts." Thesis, University of Hamburg, 1–77. (1981).

Külper, K. "Untersuchungen über Homogene, Chlorhaltige Ziegler–Katalysatoren." Diplomarbeit, Universität Hamburg, 1–77. (1981).

Lapport, M. et al. "Metallocene Derivatives of Early Transition Metals. Part 2. Substituted Cyclopentadienyl Group 4A Dichloro–metallocene Complexes [M(h– C5H4R)2Cl2] (M=Zr or Hf; R=Me, Et, Pr1, Bu1, or SiMe3), their Mono- and Di-alkyl Derivatives [M(_-C5H4R)2R'X] (X=" J. Chem. Soc. Dalton Trans. 805–813. (1981).

Marsell, J. et al. Transition–Metal–Mediated Hydrogenation of CO to Olefins: Intermediacy of Coordinated Carbenes. J. Am. Chem. Soc. 103, 5596. (1981).

Miri, M. "Ethylen/1–Hexen–Copolymere und Ethylen/1, 7–Octadien–Copolymer hergestellt mit dem 'Ziegler–Katalysator' Bix (cyclopentadienyl) zirkonium dimethyl/Methylaluminoxan." Diplomarbeit, Universität Hamburg, 1–151. (1981).

Smith, J. and Brintzinger, H. "ansa–Metallocene Derivatives III. Inclucence of an Interannular Ethylene Bridge on the Reactivity of titanocene Derivatives." Master's Thesis, University of Hamburg, 1–151. (1985).

Eisch, J. "Aluminum." in Wilkinson, G., Stone, F.G.A., Abel, E.W., eds. in Comprehensive Organometallic Chemistry United Kingdom: Pergamon Press, oxford 1, 555–682. (1982).

Kaminsky, W. and Sinn, H. "Homogeneous and High Active Ziegler–Natta–Catalysis with Alumoxane as Component." Macromol. Symp. 28, 247. (1982).

Watson, P. "Ziegler–Natta Polymerization: the Lanthanide Model." J. Am. Chem. Soc. 104, 337–339. (1982).

Wild, F. et al. "ansa–Metallocene Derivatives: IV. Synthesis and Molecular Structures of Chiral ansa–Titanocene Derivatives with Bridged Tetrahydoindenyl Ligands." J. Organometal. Chem. 232:3, 233–247. (Jun. 22, 1982).

Woldt, R. "Polymerization von a–Olefin mit löslichen Ziegler–Katalysatoren bestehend aus Cyclopentadienylzirkon IIV—Beziehundgsweise den Homologen Hafniumverbindungen und Alumoxanen als Cokatalysatorkomponente." Dissertation, Universität Hamburg, 1–152 + Appendices (1982).

Eisch, J. et al. "Carbometallation of Hydrocarbons with Ziegler–Natta Agents and Its Relevance to Polymerization Mechanisms." Transition Metal Catalyzed Polymerizations, Alkenes and Dienes. Part B. Harwood Academic Publishers 799–823. (1983).

Herwig, J. and Kaminsky, W. "Halogen–Free Soluble Ziegler Catalysts with Methylaluminoxan as Catalyst." Polymer Bulletin 9, 464–469. (1983).

Kaminsky, W. "Polymerization and Copolymerization with a Highly Active, Soluble Ziegler–Natta Catalyst." in Quirk, R., Hsieh, H., Klingensmith, G. and Tait, P., eds., Transition Metal Catalyzed Polymerizations: Alkenes and Dienes, Part A, MMI Press Symposium Series, vol. 4 Chur: Harwood Academic Publishers, 225–244. (1983).

Köpz, H. and Klouras, N. "[1] Metallocenophanes: H–NMR–Studies." Z. Naturforsch. 88b, 321–325. (1983).

Reichers, K. "Polymerization of a–Olefins with Soluble Ziegler Catalysts." in Quirk, R., Hsieh, H., Klingensmith, G. and Tait, P., eds., Transition Metal catalyzed Polyemrizations: Alkenes and Dienes, Part B. Harwood Academic Publishers: New York, 465–494. (1983).

Ewen, J. "Mechanisms of Stereochemical Control in Propylene Polymerizations with Soluble Group 4B Metallocene/Methylalumoxane Catalysts." J. Am. Chem. Soc. 106:21, 6355–6364. (Oct. 17, 1984).

Ewen, J. "Mechanisms of Stereochemical Control in Propylene Polymerizations with Soluble Group 4B Metallocene/Methylalumoxane Catalysts. (correction to original article)" J. Am. Chem. Soc. 106:26, 8330. (1984).

Giannetti, E. et al. "Homogeneous Ziegler–Natta Catalysis: Efficiency Improvement of Vanadium Catalyst Systems by tributyltin Hydride for the Ethylene/Propylene/Diene Terpolymerization." Markromol. Chem. Macromol. Chem. Phys. 185:10, 2133–2151. (1984).

Tait, P. "Chapter 2. Part I. Co–ordination Complex Polymerization." in Kenkins, A., Kennedy, J. eds., Macromolecular Chemistry vol. 3. London: Royal Society of Chemistry, 3–29. (1984).

Tait, P. and Aloreid, M. "Transition Metal Alkyl Polymerization—Progress and Development." Proc. 9th Iberoamerican Symposium on Catalysis, Libson 1, 163–182. (1984).

Dutschke, J. "Polymerisationen von Ethylen auch in Gegenwart von Füllstoffen in Blasensäulen– und Wirbelschichtreaktoren mit Löslichen Zieglerkatalysatoren." Ph.D. Dissertation, Universität Hamburg, 1–109. (1985).

Eisch, J. et al. Direct Observation of the Initial Insertion of an Unsaturated Hydrocarbon into the Titanium–Carbon Bond of the Soluble Ziegler Plymerization Catalyst, Cp2TiCl2–MeAlCl2. J. Am. Chem. Soc. 107:24, 7219–7221. (1985).

Gianetti, E. et al. "Homogeneous Ziegler–Natta Catalysis. II. Ethylene Polymerization by IVB Transition Metal complexes/Methyl Aluminoxane Catalyst Systems." J. Polym. Sci.: Polym. Chem. Ed. 23, 2117–2133. (1985).

Kaminsky, W. et al. "Polymerization of Propene and butene with a Chiral Zirconocene and Methylalumoxane as Cocatalyst." Angew. Chem. Int. Ed. Engl. 24:6, 507–508. 91985).

Kaminsky, W. et al. "Ethylene Propylene Diene Terpolymers Produced with a Homogeneous and Highly Active Zirconium Catalyst." J. Polym. Sci. 23:8, 2151–2164. (Aug. 1985).

Tsutsui, M. and Eisch, J. "Organometallics—Metal II–Complexes." in Kirk–Othmer, ed. Concise Encyclopedia of Chemical Technology. New York: John Wiley & Sons, 824–825. (1985).

Wild, F. et al. " ansa–Metallocene Derivatives Synthesis and Crystal Structure of a Chiral ansa–Zirconocene Derivative with Ethylene–Bridged Tetrahydroindenyl Ligands." J. Organomet. Chem., 288:1, 63–67. (1985).

Ewen, J. "Ligand Effects on Metallocene Catalyzed Ziegler–Natta Polymerizations." Keii, T. and Soga, K., eds. Catalytic Polymerization of Olefins. Tokyo: Kodansha, 271–291. (Jul. 1986).

Kaminsky, W., and Schlobohm, M. "Elastomers by Atactic Linkage of a–Olefins Using Soluble Ziegler Catalysts." Makromol. Chem. Makcromol. Symp. 4, 103–118. (1986).

Kaminsky, W. "Preparation of Special Polyolefins from Soluble Zirconium Compounds with Aluminoxane as Cocatalyst." in Keii, T. and Soga, K., eds., Catalytic Polymerization of Olefins. Tokyo: Kodansha Ltd., 271. (1986).

Tait, P. "The Development of High Activity Catalysts in a–Olefin Polymerization." in Seymour, R. and Cheng, T., eds. History of Polyolefins. Dordrecht, Holland: D. Reidel Publishing Company, 213–242. (1986).

Grassman, P. and Callstrom, M. "Isolation and partial Characterization by XPS, of Two Distinct Catalysts in the Ziegler–Natta Polymerization of Ethylene." J. Am. Chem. Soc. 109, 7875, (1987).

Hutchinson, R. and Ray, W. "Polymerization of Olefins Through Heterogeneous Catalysis. VII. Particle Ignition and Extinction Phenomena." J. Applied Polymer Science 34, 657–676. (1987).

Kaminsky, W. and Hahnsen, H. "Polymerization of Olefins with a Homogeneous Zirconium/Alumoxane Catalyst." in Seymour, R. and Cheng, T., eds., History of Polylefins: The World's Most Widely Used Polymers. New York: Plenum Press, 361–371. (1987).

Pino, P. "Regio–and Stereospecificity in Proprolyene Polmerization with Chiral Catalytic Systems." in Lemstra, P. and Kleintjens, L., eds., Conference Proceedings, Integration of Fundamental Polymer Science and Technology, Limburg, Netherlands, 3–16. (1987).

Ahlers, A. and Kaminsky, W. "Variation of Molecular Weight Distribution of Polyethylenes Obtained with Homogeneous Ziegler–Natta Catalysts." Makromol. Chem. Rapid commun. 9:4, 457–461. (1988).

Chien, J. et al. "A Comparison of Cp2HfCl2 versus Cp2ZrCl Methylaluminoxane Catalysts." Polym. Bull. 20, 421–425. (1988).

Chien, J. et al. "Metallocene–Methylalumnioxane Catalysts for Olefin Polymerizations. I. Trimethylaluminum as Coactivator." J. Polym. Sci. Part A. 26, 3089–3102. (1988).

Chien, J. et al. "Metallocene–Methylalumnioxane Catalysts for Olefin Polymerizations. II. Bis–(h5–Neomenthyl Cycolpentadienyl)zirconium Dichloride." J. Polym. Sci. Part A. 26, 2369–2380. (1988).

Dahmen, K. et al. "Organometallic Molecule–Support Interactions. Highly Active Organozirconium Hydrogenation Catalysts and the Formation of Cationic Species on Alumina Surfaces." Langmuir 4, 1212. (1988).

Tait, P. and Berry, I. "Monoalkene Polymerization: Copolymerization." in Allen, G. and Bevington, J., eds., Comprehensive Polymer Science: The Systehesis, Characterization, Reactions & Applications of Polymers, vol. 4, Chain Polymerization II, Eastmond, G., Ledwith, A, Russo, S. and Sigwalt, P., eds. Pergamon Press: Oxford. (1988).

Thayer, J. "Organometallic Chemnistry: An Overview." New York: VCH Publishers, Inc., 1–170. (1988).

Bueschges, V. and Chien, J. "Metallocene–Methylaluminoxane Catalysts for Olefin Polymerizations. III. Reduction of h5–Cyclopentadienyl Trichlorides of Titanium and Zirconium." J. Polym. Sci. Part A 27, 1525–1538. (1989).

Chien, J. and Rieger, B. "Anisotactic' Polypropylenes Produced with a Zirconocene Methylalumoxane Catalysts: Solid State Properties and Microstructure." Polym. Bull 21, No.2 159–163. (1989).

Chien, J. and Wang, B. "Metallocene–Methylaluminoxane Catalysts for Olefin Polymerizations, IV. Active Site Determinations and Limitation of the 14CO Radiolabeling Technique." J. Polym. Sci. Part A. 27, 1539–1558. (1989).

Jolly, C. and Marynick, D. "The Direct Insertion Mechnaism in Ziegler–Natta Polymerization: A Theoretical Study Cp2TiCH3 + C2H4 ®Cp2TiCh3H7+." J. Am. Chem. Soc. 111, 7968. (1989).

Kaminsky, W. and Spiehl, R. "Copolymerization of Cycloalkenes with Ethylene in Presence of Chiral Zirconocene Catalysts." Makromol. Cheme. 190:3, 515–526. (Mar. 1989).

Wissenfeldt, H. "Ansa–Metallocene Derivatives—XVII–racemic and meso Diastereomers of Group IV Metallocene Derivatives with Symmetrically Substituted Demethylsilandiyl Bridged Legend Frameworks. Crystal Structure of R1, S–Me2Si(3–t–Bu–5–MeC5H2)2ZrCl2)." J. of Organometallic Chemistry 369:3 359–370. (Jul. 1989).

Chien, J. et al. "Homogeneous Ziegler–Natta Catalysts and Synthesis of Anisotactic and Thermoplastic Elastomeric Poly(propylenes)." in Keii, T., Soga, K., eds. in Catalvtic Olefin Polymerization Tokyo: Kodansha 56 535–574. (1990).

Chien, J. and Wang, B. "Metallocene–MethylAluminoxane Catalysts for Olefin Polymerization. V. Comparison of Cp2ZrCI2 and Cp/ZrCI3." J. Polym. Sci. Part A. 28, 15–38. (1990).

Chien, J. et al. "rac–Ethylidene (1–h5–tetramethylcyclo pentadienyl) (1–h5–indenyl)dichloro Titanium and Its Homopolymerization of Propylene to Crystalline–Amorphous Block thermoplastic Elastomer." J. Am. Chem. Soc. 112, 2030–2031. (1990).

Miya, S. et al. "37. Propylene Polymerizations with Silylene–Bridged Metallocene Catalysts." in Keii, T. and Soga, K., eds. Catalytic Olefin Polymerization. Tokyo: Kodansha, 531–534. (1990).

Pasynkiewicz, S. "Alumoxanes: Synthesis, Structures, Complexes and Reactions." Polyhedron 10, 429. (1990).

Piccolrovazzi, N. et al. "Electronic Effects in Homogeneous Idenylzirconium Ziegler–Natta Catalysts." Organometallics 9:12, 3098–3105. (1990).

Resconi, L. et al. "Study on the Role of methylalumoxane in Homogeneous Olefin Polymerization." Macromolecles 23, 4489. (1990).

Rieger, X. "Degree of Stereochemical Control of rac–Et [Ind]2ZrCl2MAO Catalyst and Properties of Aristotacotic Polypropylenes." Macromolecules 23:22, 3559–3568. (Oct. 23, 1990).

Chien, J. et al. "Isospecific Polymerization of Propylene Catalyzed by rac–Ethylene–bis(indenyl)Methylzirconium Cation." J. Am. Chem. Soc. 113, 8570–8571. (1991).

Chien, J. and Sugimoro, R. "Kinetics and Stereochemical Control of Propylene Polymerization Initiated by Ethylene bis(4,5,6,7–tetrahydro–1–indenyl) Zirconium dichloride/ Methyl Aluminoxane Catalyst." J. Polym. Sci. Part A. 29, 459–470. (1991).

Chien, J. and Sulajka, Z. "Syndiospecific Polymerization of Styrene. I. Tetrabenzyl Titanium/Methylaluminoxane Catalyst." J. Polym. Sci. Part A 29, 1243–1251. (1991).

Chien, J. and Sulajka, Z. "Syndiospecific Polymerization of Styrene. II. Mononcyclopentadienyltributoxy/Titanium/Methylaluminoxane Catalyst." J. Polym. Sci. Part A 29, 1253–1263. (1991).

Chien, J. et al. "Two–State Propagation Mechanism for Propylene Polymerization Catalyzed by rac–[anti–Ethyl idene(1–h5–tetramethylcyclopen–tadienyl)(1–h5–indenyl) Dimethyltitanium." J. Chem. Soc. 113:22, 8569–8570. (1991).

Chien, J. and He, D. "Olefin Copolymerization with Metallocene Catalysts. I. Comparison of Catalysts." J. Polym. Sci. Part A. 29, 1585–1593. (1991).

Chien, J. and He, D. "Olefin Copolymerization with metallocene Catalysts. II. Kinetics, Cocatalyst and Additives." J. Polym. Sci. Part A. 29, 1595–1601. (1991).

Chien, J. and He, D. "Olefin Copolymerization with Metallocene Catalysts. III. Supported Metallocene/Methylaluminoxane Catalyst For Olefin Copolymerization." J. Polym. Sci. Part A 29, 1603–1607. (1991).

Chien, J. and He, D. "Olefin Copolymerization with Metallocene Catalysts. IV. Metallocene/Methylaluminoxane Catalyzed Olefin Terpolymerization." J. Polym. Sci. part A 29, 1609–1613. (1991).

Eisch, J. et al. "Formation of Ion Pairs in the Ziegler Ethylene Polymerization Catalyst System, Cp2Ti(Cl)CH2SiMe3–AlCl3." Organometallics 10:10, 3417–3419. (Oct. 1991).

Ewen, J. et al. "Metallocene/Polypropylene Structural Relationships: Implications on Polymerization and Stereochemical Control Mechanisms." Die Makromol. Chem., Macromol. Symp., 48/49 253–295. (1991).

Gurian, P. et al. "Aluminum Complexes of N2N'-Ethylenebis(salicylideneimine)–(H2selen). X–Ray Crystal Structures of [{Al(salen)}2($\mu$–O] MeCN and [Al(OC6H2Me3–2,4,6)(salen)]." J. Chem. Soc. Dalton Trans. (1991).

Hutchinson, R. and Ray, W. "Polymerization of Olefins Through Heterogeneous Catalysis—the Effect of Condensation Cooling on Particle Ignition." J. Applied Polymer Science 43, 1387–1390. (1991).

Kaminsky, W. et al. "New Results of the Polymerization of Olefins with Metallocene/Aluminoxane–Catalysts." Polymer Preprints, 32:1, 467–468. (Apr. 1991).

Kaminsky, W. et al. "New Polymers by Homogeneous Zirconocene/Aluminoxane Catalysts." Die Makromol. Chem. Macromol. Symp., 47, 83–93. (Jul. 1991).

Zambelli, A. and Grassi, A. "Copolymerization of Ethylene with Propene in the Presence of Homogeneous Catalytic Systems Based on Group 4 Metallocenes and Methylalumoxane: Implication of the Reactivity Ratios on the Ratio Mechanism." Die Makromol. Chem., Rapid. Commun., 12:8, 523–528. (Aug. 1991).

Apblett, A. et al. "Synthesis and Characterization of Triethylsiloxy–Substituted Alumoxanes: Their Structural Relationship to the Minerals Boehmite and Diaspore." Chem.. Mater. 41:1, 167–182. (1992).

Cheng, H. et al. "Consecutive Two–State Statistical Polymerization Models." Macromolecules 25, 6980–6987. (1992).

Chien, J. et al. "Difference in Stereoselective Polymerization of 4–Methyl–1–Hexene by Homogeneous and Heterogeneous Ziegler–Natta Catalysts." Makromol. Chem., Rapid Commun. 13:11, 479–484. (1992).

Chien, J. et al. "Metallocene Catalysts for Olefin Polymerizations. XXIV. Stereoblock Propylene Polymerization Catalyzed by rac–[anti–Ethylidene(1– 5–Tetramethylcyclopentadienyl)(1–5–Indenyl)dimethylitanium: A Two–State Propagation." J. Polym. Sci. Part A. 30, 2601–2617. (1992).

Chien, J., and Dong, S. "Methylaluminoxane/halalkane as Initiator System for Styrene Polymerization." Polymer Bulletin 29, 515–519. (1992).

Chien, J. "Stereochemical Control in Homogeneous Ziegler–Natta Catalyst." Makromol. Chem. Macromol. Symp. 63, 209–217. (1992).

Chien, J. et al. "Syndiospecific Polymerization of Styrene. 3. Catalyst Structure." Macromolecules 25, 3199–3203. (1992).

Collins, S. and Kelley, W. "The Microstructure of Poly(cyclopentene) Produced by Polymerization of Cyclopentene with Homogeneous Ziegler–Natta Catalysts." Macromolecules 25:1, 233–237. (1992).

Kaminsky, W. and Barky, A. "Copolymerization of Ethene and Dimethanooctahydronaphthalene with Aluminoxane Containing Catalysts." Polymer International 28:3, 251–253. (1992).

Kaminsky, W. et al. "Enantioselective Oligomerization of – Olefins with Chrial Zirconocene/Aluminoxane Catalysts." Proceedings of the Fourth Symposium in Aachen, Organic Synthesis via Organometallics 151. (Jul. 1992).

Kaminsky, W. et al. "Standardization Polymerization of Ethylene and Propene with Bridged and Unbridged Metallocene Derivatives: A Comparison." Makromol. Chem. 193, 1643–1651. (1992).

Llinas, G. and Chien, J. "Comparison of Polymerization Catalyzed by the Syn and Anti Diastereomers of [Ethylidene(1—indenyl)]Titanium Dichloride and Methylaluminoxane." Polym. Bull. 28, 41–45. (1992).1.

Llinas, G. and Chien, J. "Crystalline–Amorphous Block Polypropylene and Non–Symmetric Ansa–Metallocene Catalyzed Polymerization." Macromolecules 25, 1242–1253. (1992).

Sishta, C. et al. "Group 4 Metallocene–Alumoxane Olefin Polymerization Catalysts. CPMAS–NMR Spectroscopic Observation of "Cation–like" Zirconocene Alkyls." J. Am. Chem. Soc. 114, 1112. (1992).

Soga, K. and Kaminaka, M. "Polymerization of Propene with the Heterogeneous Catalysts System Et[IndH4]2ZrCl2/MAO/SiO2 Combined with Trialkylaluminium." Makromol. Chem., Rapid Commun. 13:4, 221–224. (1992).

Tait, P. et al. "Rate of Ethylene Polymerization with the Catalyst System (–5–RC5H4)2ZrCl2–Methylaluminoxane: Effects of Cyclopentadienyl Ring Substituents." In Edwin J., ed. In Catalysis in Polymer Synthesis ACS Symposium Series 496, 78–87. (1992).

Bochmann, H. and Lancaster, A. "Base–Free Cationic Zirconium Benzyl Complexes as Highly Active Polymerization Catalysts." Organometallics 12:3, 633–640. (Mar. 1993).

Chien, J. and Tsai, W. "Zirconocenium Cation Catalysis of Propene Polymerizations." Die makromol. Chem., Macromol. Symp 66, 141–156. (1993).

Dias, A. et al. "Catalytic Polymerization of Ethylene with Metallocenes and Aluminoxanes: Active Centre Determination and Polymer Characterization." Abstracts Worldwide Metallocene Conference Houston, Texas 393–396. (1993).

Eisch, J. et al. "Active Sites for Ethylene Polymerization with Titanium (IV) Catalysts in Homogeneous media: Multinuclear NMR Study of Ion–pair Equilibria and their Relation to Catalyst Activity." Organometallics 12, 3856–3863. (1993).

Eisch, J. et al. "Role of Ion–Pair Equilibria in Homogeneous Ziegler–Natta Olefin Polymerization Catalysts." Die Makromol. Chem. Makromol. Symp. 66, 109–120. (1993).

Kaminsky, W. and Renner, F. "High Melting Polypropenes by Silica–Supported Zirconocene Catalysts." Makromol. Chem. Rapid. Commun. 14:4, 239–243. (1993).

Kashiua, N. et al. "Panel Discussion II: Molecular Mechanisms of Polymerization Catalysis." Makromol. Chem., Macromol. Symp. 66, 329–334. (1993).

Marques, M. et al. "Active Centres Determination: A Comparative Study between Hetereogeneous Ziegler–Natta Systems and Metallocene–aluminoxane ones." Abstracts Worldwide Metallocene Conference Houston, Texas 397–400. (1993).

Mason, M. et al. "Hydrolysis of Tri–tert–butylaluminum: The First Structural Characterization of alkylalumoxanes [R2Al)2O] and (RAlO)." J. Chem. Soc. 115:12, 4971–4984. (1993).

Soga, K. and Kaminaka, M. "Polymerization of Propene with Zirconocene–Containing Supported Catalysts Activated by Common Trialkylaluminiums." Makromol. Chem., Macromol. Chem. Phys. 194:6, 1745–1755. (1993).

Zambelli, A. and Pellecchia, C. "Classical and Metallocene Catalytic Systems: Comparison between the Stereochemical mechanisms of –Olefin Polymerization." Die Makromol. Chem. Macromol. Symp., 66, 1–10. (1993).

Böhm, L. et al. "The Industrial Synthesis of Bimodal polyethylene." in Soga, K. and Terano, M., eds., Catalyst Design for Tailor–made Polyolefins. Tokyo: Kodansha Ltd., 351. (1994).

Eisch, J. et al. "The Role of Ion–Pair Equilibria on the Activity and Stereoregularity of Soluble Metallocene Ziegler–Natta Catalysts." in Soga, K. and Terano, M., eds., Catalyst Design for Tailor–made Polyolefins. Tokyo: Kodansha Lt., 221–235. (1994).

Fischer, D. and Mülhaupt, R. "The Influence of Regio–and Stereoirregularties on the Crystallization Behaviour of Isotactic Poly(propylene)s Prepared with Homogeneous Group IVa Metallocene/Methylaluminoxane Ziegler–Natta Catalysts." Macromol. Chem. Phys. 195 1433–1441. (1994).

Flores, J.C. et al. "[2–(Dimethylamino)ethyl}cyclopentadienyl}trich–lorotitanium: A new type of Olefin Polymerization Catalyst." Organometallics 13:11, 4140–4142. (Nov. 1994).

Guo, Z. et al. "Cationic Zirconium and Hafnium Isobutyl Complexes as Models for Intermediates in Metallocene–Catalyzed Propylene Polymerizations. Detection of an Agostic Interaction in (C5Me5Hf(CH2CHMe2)PMe3)+." Organometallics 131:4, 1424–1432. (Apr. 1994).

Ihm, S. et al. "Molecular Weight Distribution Control with Supported Metallocene Catalysts." in Soga, K. and Terano, M., eds., Catalyst Design for Tailor–made Polyolefins. Tokyo: Kodansha Ltd., 299. (1994).

Kaminsky, W. et al. "High Melting Point Polypropylene by Supported Metallocene Catalysts." H. Proc. Met. Con. '94 Houston, TX. (May 25–27, 1994).

Kaminsky, W. "Zirconocene Catalysts for Olefin Polymerization." Catalysis Today 20 257–271. (1994).

Karol, F. and Kao, S. "37. Ligand Effects at Transition Metal Centerss for Olefin Polymerization." in Soga, K. and Terano, M., eds., Catalyst Design for Tailor–Made Polyolefins. Tokyo: Kodansha Ltd. (1994).

Kucht, A., Kucht, H. et al. "Substitutent Effects on Titanocenium Catalysts." Oganomet. Chem. 8:5, 437–443. (1994).

Masi, F. and Menceni, F. "Characterization of Active Sites in Ti/Hf/MgCl2 catalysts by Chiral Reagents." in Soga, K. and Terano, M., eds., Catalyst Design for Tailor–made Polyolefins. Tokyo: Kodansha Ltd., 73. (1994).

Soga, K. and Kaminaka, M. "Polymerization of Propene with a rac–(CH3)2 Si(2,4–(CH3)2C5H3(3', 5'–(CH3)2C5H3)ZrCl2/MAO/SiO2–Al(iC4H9)3 Catalyst System." Macromol. Rapid Commun. 15:7, 593–600. (Jul. 1994).

Spaleck, W. et al. "The Influence of Aromatic Substituents on the Polymerization Behavior of Bridged Zirconocene Catalysts." Organometallics 13:3, 954–963. (Mar. 1994).

Zambelli, A. and Pellecchia, C. "Copolymerization of Hydrocarbon Monomers in the Presence of CpTiCl3–MAO." in Soga, K. and Terano, M., eds., Catalyst Design for Tailor–made Polyolefins. Tokyo: Kodansha Ltd., 209. (1994).

Barron, A. "New Method for the Determination of the Trialkylaluminum Content in Alumoxanes." Organometallics 14:7, 3581–3583. (1995).

Bliemeister, J. "The Role of MAO–Activators." in Fink, G., Mülhaupt, R. and Brintzinger, H., eds. Ziegler Catalysts: Recent Scientific Innovations and technological Improvements. berlin: Springer–Verlag, 57–82. (1995).

Eisch, J. "Chapter on Aluminum Organometallics in Organic Synthesis." Comprehensive Organometallic chemistry II 11, 277–311. (1995).

Eisch, J. "The Roles of Oxidation State, Lewis cid Catalyst and Solvent Polarity in Activating Titanium Compounds for Olefin Polymerization." Macromol. Symp. 89, 221–229. (1995).

Kaminsky, W. "Influence of Metallocene Catalysts on Activity and Polyolefin Properties." H. Proc. Met. Con., 95 Houston, TX. (May 17–19, 1994).

Kaminsky, W. "Stereospecific Oligo– and Polymerization with Metallocene Catalysts." Macromolecular Symposia: New York: Huthig & Wepf Verlag, Basel, Heidelberg. (Jan. 1995).

Labella, L. et al. "ansa–[2,2–Bis( –cyclopentadienyl)propane]– Molybenum and –Tungsten Chemistry and Related Studies." J. of Organometal. Chem. 485 Cl8–C21. (1995).

McKenna, T. et al. "Modeling of Transfer Phenomena on Heterogeneous Ziegler Catalysts: Differences Between Theory and Experiment in Olefin Polymerization (An Introduction)." J. Applied Polymer Science 57, 371–384. (1995).

Sacchi, M. et al. "Silica–Supported Metallocenes: Stereochemical Comparison between Homogeneous and Heterogeneous Catalysis." Macromol. Rapid Commun. 16:8, 581–590. (1995).

Soares, J. et al. "Metallocene/Aluminoxane Catalysts for Olefin Polymerization: A Review." Polymer Reaction Engineering 3:2, 131–200. (1995).

Yu, Z. et al. "Polymerization of Olefins and Diolefins Catalyzed by Monocyclopentadienyltatanium Complexes Containing a (Dimethylamino) ethyl Substituent and Comparison with ansu–Zirconocene Systems." J. Polym. Sci. Part A: Polym. Chem. 36, 319. (1998).

Zanoli, E. "Presentation of Observations Pursuant to Art. 115 EPC. RE: Patent No. 0 129 368." Observation to European Patent Office. (Mar. 14, 1995).

Merriam Webster's Collegiate Dictionary. 43, 817. (1996).

The Oxford Encyclopedic English Dictionary. 48, 383, 1020. (1996).

Deng, H. et al. "Synthesis of High–Melting, Isotatic Polypropene with C2– and Cl– Symmetrical Zirconocenes." Macromolecules 19:20, 6371–6376. (1996).

Diamond, G. et al. "New Mono– and Bi–Nuclear ansa–Metallocenes of Zirconium and Hafnium as Catalysts for the Polymerization of Ethene and Propene." (1996).

Eisch, J. et al. "Synthesis of Novel Organometallics and Their Use in Olefin Polymerization." U.S. Patent application. (May 1, 1996).

Flores, J. et al. "{[2–(dimethylamino)ethyl]cyclopentadienyl} Titanium Complexes Influence of the Dimethylamino Group in Ziegler–natta Polymerization Catalysis." Macromolecules 29:25, 8030–8035. (Dec. 2, 1996).

Flores, J. et al. "Cyclopentadienyl–amino Titanium Complexes in Ziegler–Natta Polymerization Catalysis." Macromolecules 29, 8030–8035. (1996).

Hamielea, A. and Soares, J. "Polymerization Reaction Engineering—Metallocene Catalysts." Prog. Polym. Sci. 21, 651–706. (1996).

Kaminsky, W. "New Polymers by Metallocene Catalysis." Macromol. Chem. Phys. 197:12, 3907–3945. (1996).

Kaminsky, W. et al. "Photoinduced rac/meso Interconversions of Bridged bis(indenyl) Zirconium Dichlorides." J. Molecular Catalysis A: Chemical 112:1, 37–42. (1996).

Lehtinen, C. and Lofgren, B. "A Comparison of (n–butCp)2ZrCl2 and other Simple Metallocenes with Bridged Et(Ind)2ZrCl2 and Me2Si(Ind)2ZrCl2 Catalysts in Ethene/Propene Copolymerization." Eur. Polym. J. 33:1, 115–120. (1996).

Ready, T. et al. "Alkyl–Substituted Idenyl Titanium Precursors for Syndiospecific Ziegler–Natta Polymerization of Styrene." J. Organomettalic Chem. 519, 21–28. (1996).

Soga, K. "Modification of Metallocene Catalysts for Olefin Polymerization." Macromol. Symp. 101, 281–288. (1996).

Chien, J. "Homogeneous Binary Zriconocenium Catalyst Systems for Proplene Polymerization. 1. Isotatic/Atactic Interfacial Compatibilzed Polymers Having Thermoplastic Elastomeric Properties." Macromolecules 30:12, 3447–3458. (1997).

Ewen, J. "New Chemical tools to Create Plastics." Scientific American 276:5, 86–91. (1997).

Justino, J. et al. "The Influence of Aluminoxane Concentration in Kaminsky Systems for Ethylene Polymerization" Abstract. (Undated).

Brickenshtein, M. et al. "Polymerization of ethylene on the di(cyclopentadienyl)titanium dichloride–dialkylaluminum chloride system in ethyl chloride in a continous–operation apparatus." Abstract. (1975).

Raspapov, L et al. "Effect of the degree of branching on the physicomechanical properties of polyethylene prepared on soluble catalysts." Abstract. (1976).

Ando et al. "Chemistry of Oxasilacyclopropane, 2.1 Formations of Dioxasilacyclopentanes in the Reaction of Oxasilacyclopropane Derivatives with Adamantanone and Norbornone." J. Am. Chem. Soc. 3613. (1977).

Ivin, K. et al. "Mechanism for the Stereospecific Polymerization of Olefins by Ziegler–Natta Catalysts." J.C.S. Chem. Comm., 604–606. (1978).

Ewen, J. "Kinetics and Bonding in Transitional metal Carbonyl Derivatives and Related Organometallic Complexes." Ph.D. Dissertation, Tulane University, I–xii, 1–147. (1979).

Schwartz, J. "The Preparation of a Di(Cyclopentadienyl) Zirconium Methylene Species From a Phosphorane." J. Organomet. Chem. 184, Cl–C2. (1980).

Leer, J.B. et al. "Structures of Tiranacyclobutanes." J. Am. Chem. Soc., 103, 7358–7361. (1981).

Steiger, R. "Reaktionen von Bis(cyclopentadienyl)zirkonium (IV)–Verbindungen mit Methylalumoxan und Polymerisationsverhalten der Produktkomplexe gegenüber Propen." Ph.D. Dissertation, University of Hamburg, 1–108. (1990).

Tait, P.J. et al. "Frontier posts in coordination type polymerization." Abstracts of International Conference Frontiers in Polymerization, Liege, Belgium, 28–29. (1993).

Tait, P.J. and Lu, G. "Influence of Internal Donors on Rate Enhancement Effect for Ethylene—Olefin Polymerization." Abstracts of International Symposium on Synthetic, Structural and Industrial Aspects of Stereospecific Polymerization, Milan, Italy, 153. (1994).

Tait, P.J. et al. "Influence of Monomer and Cocatalyst Diffusion in Propylene Polymerization using High Activity Supported Ziegler–Natta Catalysts." Abstracts of International Symposium on Synthetic, Structural and Industrial Aspects of Sterospecific Polymerization, Milan, Italy, 175. (1994).

Sinn, H. "Proposals for Structure and Effect of methylalumoxane Based on Mass Blances and Phase Separation Experiments." Macromol. Symp. 97, 27–52 (1995).

Tait, P.J. et al. "Kinetic Studies of Propene Polymerization Using Magesium Dichloride Supported Ziegler–Natta Catalysts." (Abstract). (1995).

Brawn, D. et al. "Uber den Einflub aromatiserher Azoverbindungen auf die redikalisehe Polymerisation von Styrol" Die Makomoekulare Chemie 148, 119–129. (1971).

Ushakava, T. et al. "Polyalkyl Alumoxanes and their Uses as Vanadium Catalyst Carriers for Olefin Polymerizations." Polym. Sci. USSR 21:12, 1979, 2996–3001. (Nov. 1980).

Quick, R. et al. "Transition Metal Catalyzed Polymerizations: Alkenes and Dienes Part A and B." MMI Press, 1–886. (Undated).

Kaminsky, W. et al. "Bis(cyclopentadienyl)–Zirconium Compounds and Aluminoxane as Ziegler Catalysts for the Polymerization and Copolymerization of Olefins." Die Makromol. Chem., Rapid Commun. 4:6, 417–421. (Jun. 1983).

Eisch, J. et al. Synthesis of Novel Organometallics and Their Use in Olefin Polymerization. US Patent 5,726,332. (Citation??) (Mar. 10, 1998).

Soga, K. et al. "Catalyst Design for Tailor–Made Polyoefins." International Symposium on Catalyst Design for Tailor–Made Polyolefins, Kanazawa. (Mar. 10, 1994).

Kaminsky, W. "Influence of Metallocene Catalysts on Activity and Polyolefin Properties." Metcon '95 Houston Texas. (Mar. 17, 1995).

Tait, P.J. et al. "Comparative Studies on Ethylene Polymerization using Homogeneous and Supported Metallocene Catalysts." Worldwide Metallocene Conference, Houston, Texas. (1995).

Tait, P.J. et al. "Some Recent Advances in Supported Metallocene Catalysts." MetCon '96. (Jun. 12, 1996).

Tait, P.J. et al. "Propylene Polymerization Studies Using Supported Metallocene Catalysts." MetCon '97: "Polymers in Transition", Houston, Texas. (1997).

Katz, T. Preparation of Metallocenes From Hydrocarbon Dianions. J. Am Chem. Soc.; 95:9, May 2, 1973 pp. 2934–2939. (Oct. 20, 1972).

Cotton, F. et al. "Chapter 25—Introductory Survey of Transition Elements." Advanced Inorganic Chemistry, p. 625. (1966).

Cotton, F. et al. "Chapter 19—Introduction to the Transition Elements." Advanced Inorganic Chemistry, p. 328. (1972).

Zachmann, H. et al. "Jahresbericht 1981 Der Abteilung Fur Angewandte Chemie Im Institut Fur Anorganische U. Angewandte Chemie." Der Universitat Hamburg. (1981).

Sinn, H. "Letter to Mr. Sinn from Dieter Klamman." 1 page. (1982).

Atwood, J. et al. "Decomposition of High–Oxygen Content Organoaluminum Compounds, The Formation and Structure of the [Al7O6Me16] Anion." Organometallics, 2, 985–989. (1983).

Albright, T. et al. "Chapter 21—The Isolobal Analogy." Orbital Interactions in Chemistry. (1985).

Cotton, F. and Wilkinson, G. "Chapter 17—Survey of the Transition Elements." Advanced Inorganic Chemistry, Fifth Edition. (1988).

Emsley, J. "The Elements." Clarendon Press, Oxford, pp. 62–63, 168–169, 210–211. (1989).

Sishta, C. et al. "Group 4 Metallocene–Alumoxane Olefin Polymerization Catalysts. (CPMAS–NMR Spectroscopic Observation of"Cation–like" Zirconocene Alkyls." J. Am. Chem. Soc. 114, 1112–1114. (1992).

Bierwagen, E. et al. "Theoretical Studies of Ziegler–Natta Catalysis: Structural Variations and Tacticity Control." J. Am. Chem. Soc., 116, 1481–1489. (1994).

Uhl, W. et al. "Tetrakis[bis(trimethylsily)methyl] dialuminoxane with a Linear Al–O–Al Group." Angew. Chem. Int. Int. Ed. Engl., 1995, No. 9; German version: Angew. Chem. 107, 1122. (1995).

Wehmachite, R. et al. "A New Synthetic Route to Organoalumoxanes (RAlO)n: Synthesis of (MES* AlO)4 (Mes*=Me or Et)." J. Am. Chem. Soc., 119, 8387–8388. (1997).

O'Brien, S. et al. "EXAFS analysis of a chiral alkene polymerisation catalyst incorporated in the mesoporous silicate MCM–41." Chem. Commun., 1905–1906. (1997).

Beard, W. et al. "Progress in Methyaluminoxane (MAO) Characterization." Albermarle Corporation, Baton Rouge, LA. (1997).

Kaminsky, W. "Extreme verzerrte Bindungswinski bei Organozirconium verbindungem, die gegen Ethylen active sind." Angew. Chem. 688.

Kopz, J. et al. "Di(cyclopentadienyl)–2, 2–bis (diethylalumino) ethyl–zirconium cyclopentadienide C25H38Al2Zr." Cryst. Struct. Com. 9. 271. (1980).

Sinn, H. et al. "Lebende Polymere bei Ziegler–Katalysatoren extremer Produktivitut." Angew. Chem 92. 396. (1980).

Kopz, J. et al. "Al, Zr–m–Hydrio–(triethylalumino)– (tricyclopentadienyl) zirconium (IV), C21H31AlZr." Cryst. Struct. Com. 9. 985 (1980).

Kaminsky, W. "Polymerization and Copolymerization with a high Active Halogen." MMI–Symposium, Midland/USA. (1981).

Wailes, P. et al. "Organometallic Chemistry of Titanium, Zirconium and Hafnium." Academic Press, Inc. p. 1–299. (1974).

Klouras, N. "Präparative and Strukturelle Untersuchungen An Element–Verbruüken [1] Metallocenophanen und Vervandten Verbindungen." Ph.D. Dissertation, University of Hamburg,. (1981).

Külper, K. "Investigations Concerning Homgeneous, Chlorine–Containing Ziegler Catalysts." Ph.D. Dissertation, University of Hamburg. (1981).

E.L. Hoel et al. "Effect of Diffusion on Heterogenous Ethylene Propylene Copolymerization." AIChE Journal, 40, 1669. (1994).

V.K. Gupta et al. "Metallocene Complexes of Group 4 Elements in the Polymerization of Monoolefins." J.M.S.— Rev. Macromol. Chem. Phys., C34(3), 439. (1994).

M.L.H. Green et al. "New ansa–Metallocenes of the Group 4 Transition Metals as Homogeneous Catalysts for the Polymerization of Propene and Styrene." J. Chem. Soc. Dalton Trans., 1, 657. (1994).

J.C. Flores et al. "{[2–(Dimethylamino)ethyl] cyclopentadienyl}trichlorotitanium: A New type of Olefin Polymerization Catalyst." Organometallics, 13, 4140. (1994).

W. Tsai et al. "Silolene–Bridged Zirconocenium Polymerization Catalysts." Journal of Polymer Science, 32, 149. (1994).

K. Peng et al "Studies on Methylaluminoxane and ethylene polymerization." Journal of Molecular Catalysis, 90, 201. (1994).

F. J. Karol et al. "Ligand effects at transition metal centers for ethylene polymerization." New J. of Chemistry, 18, 97. (1994).

C. Janiak et al "Zirconium Beta–diketonate/methylaluminoxane systems as single–site catalysts for the preparation of high–molecular–weight polyethylene." Macromol. Rapid Commun. 15, 655. (1994).

W. Kaminsky et al. "Polymerization of Propene and Butene with a Chiral Zirconocene and Methylalumoxane as Cocatalyst." Angew. Chem. Int. Ed. Engl., 6, 507. (1985).

S. Pasynkiewicz. "Alumoxanes: Synthesis, Structures, complexes and Reactions." Polyhedron, 9, 429. (1990).

B. Reiger et al. "Degree of Stereochemical Control of rac–Et[Ind]2ZrCl2/MAO Catalyst and Properties of Anisotactic Polypropylenes." Macromolecules, 23, 3559. (1990).

N. Piccolrovazzi et al. "Electronic Effects in Homogenous Indenylzirconium Ziegler–Natta Catlysts." Organometallics, 9, 3098. (1990).

K. Soga et al. "Copolymerization of Styrene and Substituted Styrenes with Ti(OMen)4–Methylaluminoxane Catalyst." Macromolecules, 23, 953. (1990).

K. Soga et al. "Syndiotactic Polymerization of Styrene with Supported Kaminsky–Sinn Catalysts." Macromolecules, 23, 957. (1990).

F. Calderazzo et al. "Arene Derivatives of Zirconium(II) and Hafnium(II)." J. Chem. Soc. Dalton Trans., 1813. (1990).

L. Oliva et al. "Polymerization of 1,3–alkadienes in the presence of Ni– and Ti–based catalytic systems containing methylalumoxane." Makromol. Chem., Rapid Commun., 11, 519. (1990).

A. R. Siedle et al. "Exchange Reactions Between Dialkylzirconocene and Alkylaluminium Compounds." Polyhedron, 9, 301. (1990).

K. Soga et al. "Polymerication of styrene with the catalyst system prepared from hydrated transition metal (Ti, Zr) compounds and trimethylaluminium." Makromo. Chem., Rapid Commun., 9, 351. (1988).

K. Soga et al. "Copolymerication of Styrene with Indene by the Ti(OPr)4–Methylaluminoxane Catalyst." ACS, 00024–9297, 3823. (1989).

K. Soga et al. "Preparation and Characterization of Syndiotactic Poly(vinylcyclohexane) (SOGA)." ACS, 0024–9297, 1499. (1989).

T. Miyatake et al. "2–2–Thiobis(6–tert–butyl–4–methyl phenoxy)titanium or zirconium complex–methylalumoxane catalysts for polymerization of olefins." Makromol. Chem., Rapid Commun., 10, 349. (1989).

K. Soga et al. "Polymerization of alpha–Olefins with the catalysts system prepared from a hydrated transition metal compound and trimethylaluminium." Makromol. Chem., Rapid Commun., 9, 141. (1988).

W. Kaminsky et al. "Polymerization of Olefins with Homogenous Zirconocene/Alumoxane Catalysts." Polyhedron, 7, 2375. (1988).

P.J. Toscano et al. "Supported Organoactinides. High–Resolution Solid–State 13C NMR Studies of Catalytically Active, Alumina–Bound (Pentamethylcyclopentadienyl)thorium Methyl and Hydride Complexes." J. Am. Chem. Soc., 107, 653. (1985).

M.D. Rausch et al. "The formation, Crystal and Molecular Structures of Bis(eta5–Indenyl)Dicarbonyltitanium and Bix(eta5–Indenyl)Dicarbonylzirconium." Journal of Organometallic Chemistry, 327, 39. (1987).

F. Dawans et al. "Mecanismes de polymerisation stereospeciflque par les metaus de transition." Bull. Chim. Soc. Fr., 2376. (1963).

R. L. Halterman. "Synthesis and Applications of Chiral Cyclopentadienylmetal Complexes." Chem. Rev., 92, 965. (1992).

G. Erker et al. "Preparation of metallacyclic titanocene hydrocarbyl complexes and their use in propene polymerization reactions." Journal of Organometallic Chemistry, 421, 215. (1991).

W. Kaminsky et al. "Standardized polymerizations of ethylene and propene with bridged and unbridged metallocene derivatives: a comparison." Makromol. Chem., 193, 1643. (1992).

A. W. Apblett et al. "Synthesis and Characterization of Triethylsiloxy–Substituted Alumoxanes: Their Structural Relationship to the Minerals Boehmite and Diaspore." Chem. Mater., 4, 167. (1992).

W. Kaminsky et al. "Stereospecific polymerization by metallocene/aluminoxane catalysts." Journal of Molecular Catalysis, 74, 109. (1992).

L. Resconi et al. "Olefin Polymerization at Bis(pentamethylcyclopentadienyl)zirconium and –hafnium Centers: Chain–Transfer Mechanisms." J. Am. Chem. Soc., 114, 1025. (1992).

C. Shishta et al. "Group 4 Metallocene–Alumoxane Olefin Polymerization Catalysts. CPMAS–NMR Spectroscopic Observation of "Cation–like" Zirconocene Alkyls." Journal of Am. chem. Soc., 114, 1112. (1992).

J. C. W. Chien et al. "Syndiospecific Polymerization of Styrene. I. Tetrabenzyl Titanium/Methylaluminoxane Catalyst." Journal of Polymer Science, 292, 1243. (1991).

J. C. W. Chien et al. "Olefin Copolymerization with Metallocene Catalysts. III. Supported Metallocene/Methylaluminoxane Catalyst for Olefin Copolymerization." Journal of Polymer Science, 29, 1603. (1991).

J. C. W. Chien et al. "Kinetics and Stereochemical Control of Propylene Polymerization Initiated by Ethylene Bis(4,5, 6,7–Tetrahydro–1–Indenyl) Zirconium Dichloride/Methyl Aluminoxane Catalysts." Journal of Polymer Science, 29, 459. (1991).

G. Erker et al. "Cp–Substituent Addivity Effects Controlling the Stereochemistry of the Propene Polymerization Reaction at Conformationally Unrestricted (Cp–CHR1R2)2ZrCl2/Methylalumoxane Catalysts." J. Am. Chem. Soc., 113, 7594. (1991).

J.T. Leman et al. "Mesitylindium(III) Halide Compounds. X–ray Crystal Structures of [InIMes2]2 and [InI1Mes] omega." Organometallics, 10, 1766. (1991).

A. R. Siedle et al. "Solvolysis of Dimethylzirconocene by Trialkylaluminum Compounds." Organometallics, 10, 400. (1991).

J. C. W. Chien et al. "Isospecific Polymerization of Propylene Catalyzed by rac–Ethylenebis(indenyl)methylzirconium "Cation"." J. Am. Chem. Soc., 113, 8570. (1991).

S. A. Sangokoya et al. "Toward Unusual Al–O Compounds. Synthesis and Molecular Structure of [Al4O(OCH2CF3) 11]–:Structural Characterization of a Novel Al4O12 Cluster." Organometallics, 12, 2429. (1993).

G. H. Llinas et al. "Ethylidene(1–eta5–tetramethyl cyclopentadienyl)(1–eta5–indenyl)]dichloro–zirconium: Synthesis, Molecular Structure, and Polymerization Catalysis." Organometallics, 12, 1283. (1993).

M. R. Mason et al. "Hydrolysis of Tri–tert–butylaluminum: The First Structural Characterization of Alkylalumoxanes [R2Al)2O]n and (RAIO)n." J. Am. Chem. Soc., 115, 4971. (1993).

J. Endo et al. "Theoretical Study on Hydrozirconation." Organometallics, 12, 2777. (1993).

L. S. Hegedus. "Transition Metals in Organic Synthesis Annual Survey Covering the Year 1980." J. Organomet. Chem., 237. (1982).

J. D. Smith. "Aluminium Annual Survey for the Year 1980." J. Organomet. Chem. Aluminum (Annual Survey for the year 1980). (1980).

W. A. Hermann. "The Methylene Bridge." Advances in Organometallic Chemistry, 20, 159. (1982).

W. Kaminsky et al. "Bis(cyclopentadienyl) Zirkon Verbindugen und Aluminoxane als Ziegler–Katalysatorem fur die Polymerisation und Copolymersation von Olefinen.".Makromol. Chem., Rapid Commun., 4, 417. (1983).

J. A. Labinger. "Titanium, Zirconium and Hafnium Annual Survey Covering the Year 1980." J. Organomet. Chem., 227. (1982).

J. Tian et al. "dichloro(eta5–cyclopentadienyl){[1–(40–methoxyphenyl)cyclohexyl]–eta5–cyclopentadienyl}titanium(IV)." Acta Cryst., C51, 1065. (1995).

S. Chacon et al. "C2–symmetric ansa metallocenes of titanium and zirconium with a ligand system that yields pure rac isomer: preparation and crystal structures of rac–{(eta5–C5H2–2–SiMe3–4–CMe3)2SiMe2}MCl2 (M=Ti or Zr)." J. Organomet. Chem., 497, 171. (1995).

Y. Chen et al. "1,3–Propanediyl)silylene–bis(1–indenyl) dichlorozirconium. Synthesis and polymerization catalysis." J. Organomet. Chem., 487, 29. (1995).

M. P. Coles et al. "Well–defined Ethylene Polymerisation Catalysts derived from Bis(imido) Chromium(vi) precursors." J. Chem. Soc., Chem. Commun., 1709. (1995).

M. A. Giardello et al. "Chiral Cl–Symmetric Group 4 Metallocenes as Catalysts for Stereoregular alpha–Olefin Polymerization. Metal, Ancillary Ligand, and Counteranion Effects." J. Am. Chem. Soc., 117, 12114. (1995).

C. J. Harlan et al. "Three–Coordinate Aluminum Is Not a Prerequisite for Catalytic Activity in the Zirconocene—Alumoxane Polymerization of Ethylene." J. Am. Chem. Soc., 117, 6465. (1995).

C. C. Landry et al. "From Minerals to Materials: Synthesis of Alumoxanes from the Reaction of Boehmite with Carboxylic Acids." J. Mater. Chem., 5(2), 331. (1995).

Y. Mu et al. "New Ligand Environments for Soluble Ziegler–Natta Olefin Polymerization Catalyst Precursors. X–Ray Structures of [eta5–C5Me2Si(Me2)OCH2C4H7NH) ZrCl3] and [eta5–C5Me4Si(Me3)2Zr2CH3)2(mu–eta2–C5H9NO)2]." Polyhedron, 14, 1. (1995).

R. Quijada. "The influence of the transition metal and the heteroatomic–bridge on the action of metallocene/methyl aluminoxane catalysts in ethylene polymerization and on the properties of the polymer." Macromol. Rapid Commun., 16, 357. (1995).

J.D. Scollard et al. "Sterically Demanding Diamide Ligands: Synthesis and Structure of d0 Zirconium Alkyl Derivatives." Organometallics, 14, 5478. (1995).

W. Song et al. "Disiloxane bridged indenyl metallocene catalysts for olefin polymerizations." J. of Organomet. Chem., 501, 375. (1995).

R.E.v. H. Spence et al. "Toward One–Component Group 4 Homogeneous Ziegler–Natta Olefin Polymerization Catalysts: Hydroboration of Zirconium Bisalkyls with Pendant 2–Propenyl Groups Using [(C6F5)2BH]2." Organometallics, 14, 4617. (1995).

J. Tian et al. "A Differential Scanning Calorimetry Study of Plasma Irradiation Grafting of Nascent Polyethylene Reactor Powder." Macromol. Rapid Commun., 15, 923. (1994).

J. Tian et al. "Ethylene Polymerization with Catalysts Systems Based on Metallocenes with Varying Steric Hindrance and Methylalumoxane." J. of Applied Polymer Science, 55, 741. (1995).

Z. Yu et al. "Olefin Terpolymerizations. I. 1,4–Hexadiene." J. of Polymer Science, 33, 979. (1995).

Z. Tu et al. "Olefin Terpolymerizations. III. Symmetry, Sterics, and Monomer Structure in ansa–Zirconocenium Catalysis of EPDM Synthesis." J. of Polymer Science, 33, 2795. (1995).

Y. Chen et al. "Heptane–Soluble Mogogeneous Zirconocene Catalysts: Synthesis of a Single Diastereomer, Polymerization Catalysis, and Effect of Silica Supports." J. of Polymer Science, 33, 2093. (1995).

J. C. Flores et al. "N,N'–Bis(trimethylsilyl)benzamidinato] titanium and –zirconium Compounds. Synthesis and Application as Precursors for the Syndiospecific Polymerization of Styrene." Organometallics, 14, 1827. (1995).

K. H. Thiele et al. "2,6–Bis(methylencyclopentadienyl)–pyridin–zirconocen– und –hafnocendichlorid; bildung und Kristallstruktur von [C5H3N–2,6–(CH2—C5H4)2Zr(Cl)(OH2)]2[ZrCl6]." Zeitschrift fur anorg. Allg. Chem., 621, 1106. (1995).

F. Garbassi et al. "XPS study of metallocene based catalysts for the polymerization of ethylene." J. of Molecular Catalysis, 101, 199. (1995).

P. Foster et al. "Aromatic Substituted Group 4 Metallocene Catalysts for the Polymerization of alpha–Olefins." Organometallics, 15, 4951. (1996).

J. C. Flores et al. "[2–(Dimethylamino)ethyl] cyclopentadienyl}titanium Complexes. Influence of he Dimethylamino Group in Ziegler–Natta Polymerization Catalysis." Macromoleculess, 29, 8030. (1996).

G. D. Silvestro et al. "Polymerization of propene with enantiomorphic site catalysts. 1 A statistical analysis." Macromol. Chem. Phys., 197, 3209. (1996).

J. tian et al. "A New Zirconocene Complex, [{eta5–C5H4–C(CH2)5(CH2)2CH(CH3)2}2Z4Cl2]." Acta Cryst., C52, 19. (1996).

H. V. Rasika Dias et al. "Synthesis and characterization of Lithium, Zirconium, and Hafnium Derivatives of N–Isopropyl–2–(isopropylamino)troponiminate." Inorg. Chem., 35, 6074. (1996).

E. Ihara et al. "Single site polymerization of ethylene and 1–olefins initaited by rare earth metal complexes." Macromol. Chem. Phys., 197, 1909. (1996).

Y. Koide et al. "Polyketone Polymers Prepared Using a Palladium/Alumoxane Catalyst System." Macromolecules, 29, 1110. (1996).

D.Coevoet et al. "Activation of rac–ethylenebis(Indenyl)zirconium dichloride with a low amount of methylaluminoxane (MAO) for olefin polymerizationsa)." Macromol. Chem. Phys., 197, 855. (1996).

E. F. Murphy et al. "First Mixed Fluoro–Chloro Group 4 Organometallics: Synthesis and Spectroscopic and Structural Characterization of [{(C5Me5)ZrF2Cl}4], [{(C5Me)HfF2Cl}4],[(C5Me5)rZr4(mu–F)2(mu–F2)2 (mu–Cl)2Cl4], [(C5Me5)4Hf4(mu–F2)2(mu–Cl)2Cl4], [(C5Me4Et)2ZrClF], and [C." Inorg. Chem., 35, 23. (1996).

W. Kaminsky et al. "Photoinduced rac / meso interconversions of bridged bis(indenyl) zirconium dichlorides." J. of Molecular Catalysis, 112, 37. (1996).

J. Loos et al. "Morphological studies on syndiotactic polypropylene prepared by ansa–metallocenes." Polymer, 37, 387. (1996).

E. F. Murphy et al. "Synthesis and spectroscopic characterization of a series of substituted cyclopentadienyl Group 4 fluorides; crystal structure of the acetylacetonato complex [(acac)2(eta–C5Me5)Zr(mu–F)SnMe3Cl]." J. Chem. Soc., Dalton Trans., 1983. (1996).

D. E. Richardson et al. "Intrinsic Ancillary Ligand Effects in Cationic Zirconium Polymerization Catalysts: Gas–Phase Reactions of [L2ZrCH3]– Cations with Alkenes." J. Am. Chem. Soc., 118, 11244. (1996).

H. Schumann et al. "Metallorganische Verbindungen der Lanthanoide. 113[1] [(tert–Butylcyclopentadienyl)(cyclopentadienyl) dimethylsilan]–Komplexe ausgewahlter Lanthanoide." Zetischrift fur anorg. allg. Chem., 622, 1865. (1996).

I. Tritto et al. "Cationic Titanium(IV) Complexes with XB(C6F5)3– Counter Ions as Model Active Sites for Ethylene Polymerization." Gazzetta Chimica Italiana, 126, 383. (1996).

G. P. Belov et al. "Kinetics of olefin polymerization catalysed by various zirconocene/aluminoxane systems at law Al/Zr ratios." J. of Molecular Catalysis, 115, 155. (1997).

H. Mack et al. "Synthesis, Characterization and reactivity of amido titanium and zirconium complexes." J. of Organo. Chemistry, 525, 81. (1996).

Y. Koide et al. "Reaction of Amiones with [(tBu)Al(mu3–O)]6: Determination of the Steric Limitation of a Latent Lewis Acid." Organometallics, 15, 5514. (1996).

T. Brackenmeyer et al. "Synthesis and Structure of Donor–Ligand–Stabilized Tris(cyclopentadienyl)zirconium Cations." Organometallics, 16, 531. (1997).

S. Bruzaud et al. "omega–Chloro–a–olefins as co– and termonomers for the synthesis of functional polyolefins." Macromol. Chem. Phys., 198, 291. (1997).

E. Negishi et al. "An Odyssey for Stoichometric Carbotitanation of Alkynes to Zirconium–catalysed Enantioselective Carboalumination of Alkenes." Chemical Society Reviews, 417. (1996).

M. Akakura et al. "Methylalumoxane as a Highly Lewis Acidic Reagent for Organic Synthesis." Synlett, 277 (1997).

J. Dupuy et al. "Modification of Ziegler–Natta Catalysts by Cyclopentiadienyl–type Ligands: Activation of Titanium–Based Catalysts." J. of Applied Polymer Science, 65, 2281. (1997).

N. S. Barta et al. "alpha–and beta–Deuterium Isotope Effects in the MgX2 and Methylaluminoxane Promoted Intramolecular Olefin insertion of Cp2TiClR Complexes. Insight into Cocatalyst Dependence and Chain End Control in Ziegler–Natta Polymerization." J. Am. Chem. Soc., 116, 8912. (1994).

E. P. Bierwagen et al. "Theoretical Studies of Ziegler–Natta Catalysis: Structural Variations and Tacticity Control." J. Am. Chem. Soc., 116, 1481. (1994).

J. C. W. Chien et al. "Polymerization of Propylene by Zirconocenium Catalysts with Different Counter–ions." J. of Polymer Science, 32, 2387. (1994).

J. M. Vela Estrada et al. "Modelling of ethylene polymerization with Cp2ZrCl2/MAO Catalyst." Polymer, 35, 808. (1994).

L. Fan et al. "Density Functional Study of Ethylene Dimerzation by (Acetylacetonato)nickel Hydride." Inorg. Chem., 33, 5287. (1994).

R. Fierro et al. "Syndioselective Propylene Polymerization Catalyzed by rac–2,2–Dimethylpropylidene (1–eta5–cyclopentadienyl) (1–eta5–fluorenyl) dichlorozirconium." (1994).

A. Herzog et al. "Reactions of [(C5Me5)ZrF3] with AlMe3—Synthesis and Structure of a Zirconium–Aluminum–Carbon Cluster." Angew. Chem. Int. Ed. Engl., 33, 967. J. of Polymer Science, 32, 661. (1994).

E. Giannetti et al. "Homogeneous Ziegler–Natta Catalysis, II. Ethylene Polymerization by IVB Transition Metal Complexes/Methyl Aluminoxane Catalyst Systems." J. of Polymer Science, 23, 2117. (1985).

J. M. Huggins et al. "Synthesis and Structure of a Novel Bis–mu–OXO Rhenium(VI) Dimer: Re2O2(mu–O)2(CH2CMe2Ph)4." J. Organomet. Chem., 312, Cl5. (1986).

R. P. Chaplin et al. "An investgation of supported Ziegler–Natta catalysts for the polymerization of butadiene." Polymer, 28, 1418. (1987).

D. A. Young. "Synthesis and structure of zirconium tetrachloride ester complexes, ethylene oligomerization catalyst precursors." J. of Molecular Catalysis, 53, 433. (1989).

D. S. Breslow. "How we made neat stuff." Chemtech, 1990, Sep. 1989).

R. F. Jordan. "Chemistry of Cationic Dicyclopentadienyl Group 4 Metal – Alkyl Complexes." Advances in Organometallic Chemistry, 32, 325. (1991).

C. Janiak et al. "Polymeric Aluminoxanes: A POssible Cocatalytic Support Material for Ziegler–Natta–Type Metallocene Catalysts." J. of Polymer Science, 31, 2959. 91993).

H. H. Brintzinger et al. "stereospecifc Olefin Polymerization with chiral Metallocene Catalysts." Angew. Chem. Int. Ed. Engl., 34, 1143. (1995).

M. Bochmann. "Cationic Group 4 metallocene complexes and their role in polymerisation catalysis: the chemistry of well defined Ziegler catalysts." J. Chem. Soc., Dalton Trans., 255. (1996).

W. Kaminsky. "New polymers by metallocene catalysis." Macromol. Chem. Phys., 197, 3907. (1996).

J. J. Eisch et al. "Regiospecific and Stereoselective Carbometallation of Alkynylsilances by Ziegler–Natta Alkylating Agents." J. Organomet. Chem., 159, Cl3. (1978).

A. Andresen et al. "Halogen–Free Soluble Ziegler Catalysts for the Polymerization of Ethylene. Control of Molecular Weight by Choice of Temperature." Angew. Chem. Int. Ed. Engl., 15, 630. (1976).

J. D. Smith. "Aluminium. Annual Survey covering the year 1975." J. Organomet. Chem., Aluminum, (Annual Survey covering the year 1975) 103, 39. (1976).

P. C. Walles. "Titanium, zirconium and hafnium. Annual survey covering the year 1975." J. Organomet. Chem., Titanium, Zirconium and Hafnium (Annual Survey covering the year 1975) 103, 475. (1975).

L. S. Hegedus. "Transition Metal Derivatives in Organic Synthesis. Annual Survey Covering the Year 1975." J. Organomet Chem., Transition Metal Derivatives in Organic Synthesis (Annual Survey Covering the year 1975) 103, 421. (1975).

J. Holton et al. "Alkyl–bridged Complexes of the d– and f–Block Elements. Part 1. Di–mu–alkyl–bis(eta–cyclopentadienyl) metal (III) dialkylaluminium(III) complexes and the Crystal and MOlecular Structure of the Ytterbium Methyl Species." J. Chem. Soc. Dalton Trans., 45. (1979).

L. N. Sosnovskaja et al. "Study of Exchange Reactions in Soluble Systems of the Ziegler–Natta Type." J. of Molecular Catalysis, 9, 41. (1980).

J. Chihlár et al. "Polymerization of Ethylene Catalyzed by Titanocene Systems, 1. Catalytic Systems Cp2TiEtCl / (AlEtCl2 and Cp2TiEtCl / AlEtCl2+ H2O)." Makromol. Chem., 181, 2549. (1980).

W. J. Evans. "Organometallic Lanthanide Chemistry." Advances in Organomet. Chem., 24, 131. (1985).

F. Wochner et al. "ansa–Metallocene Derivatives VIII. syntheses and Crystal Structures of Ethylene–Bridged Titanocene and Zirconocene Derivatives with Permethylated Ring Ligands." J. Organomet. Chem., 288, 69. (1985).

J. W. Bruno et al. "Organo—f–Element Thermochemistry. Thorium vs. Uranium and Ancillary Ligand Effects on Metal–Ligand Bond Disruption Enthalpies in Bis(pentamethylcyclopentadienyl)actinide Bis(hydrocarbyls) and Bis(Pentamethylcyclopentadienyl)alkxyactinide Hydrides and H." J. Am. Chem. Soc., 108, 7275. (1986).

G. Jeske et al."Highly Active Organolanthides, Systematic Routes to and Olefin Chemistry of Early and Late bis(pentamethylcyclopentadienyl) 4f Hydrocarbyl and Hydride Complexes." J. Am. Chem. Soc., 107, 8091. (1985).

R. R. Thomas et al. "Chemistry of Weakly Solvated Lanthanide–Metal Cations. Synthesis, Characterization and Catalytic Chemistry of [Eu(Ch3CN)3(BF4)3]x." J. Am. Chem. Soc., 108, 4096. (1986).

N. A. Bailey et al. "The Chemistry of Tetraphenylcyclopentadienone Complexes of Ruthenium and Rhodium: the X–Ray Crystal Structure of [Ru{eta5–C5Ph4OC(O)CH(OMe)Ph}–(CO)2Cl]." J. Chem. Soc. Dalton Trans., 2815. (1987).

W. J. Evans et al. "Synthesis and X–ray Crystal Structure of mu,eta2–N–Alkylformimidoyl Complexes of Erbium and Yttrium: A Structural Comparison." Organometallics, 6, 295. (1987).

W. J. Evans et al. "Reactivity of trimethylaluminum with (C5Me5)2Sm(THF)2: Synthesis, Structure, and Reactivity of the Samarium Methyl Complexes (C5Me5)2Sm[(mu–Me)AlMe2(mu–Me)]2Sm(C5Me5)2 and (C5Me5)2SmMe(THF)1." J. Am. Chem. Soc., 110, 6423. (1988).

C. Shan et al. "Single crystal structure of a polymerization active Nd–Al bimetallic complex." Makromol. Chem., 188, 629. (1987).

Q. Shan et al. "Syntheses and molecular structures of organolanthanoids." Pure & Appl. Chem., 60, 1251. (1988).

W. J. Evans. "The Organometallic Chemistry of the Lanthanide Elements in Low Oxidation States." Polyhedron, 6, 803. (1987).

T. J. Katz et al. "Preparation of Metallocenes from Hydrocarbon Dianions." J. Am. Chem. Soc., 95:9, 2934. (1973).

U. Dämmgen et al. "Tan—Stickstoff–Verbindungen II. 1H–UND13C–KMR–Spektren Substituierter Alkylamido–Titan–Cyclopentadienyle." J. Organomet. Chem., 101, 307. (1975).

J. X. McDermott et al. "Synthesis and Reactions of Bis(cyclopentadienyl) titanium(IV) Metallocycles." J. Am. Chem. Soc., 98:21, 6529. (1976).

J. A. Smith et al. "ansa–Metallocene Derivatives. Molecular STructure and Proton Magnetic Resonance Spectra of Methylene– and Ethylene–Bridged Dicyclopentadienyltitanium Compounds." J. Organomet. Chems., 173, 175. (1979).

U. T. Mueller Westerhoff. "[m.m]Metallocenophanes: Synthesis, Structure, and Properties." Angew. Chem. Int. Ed. Enlg., 25, 702. (1986).

G. S. Herrman et al. "ansa–titanocen–und Zirconocenkomplexe mit asymmetrisch substituierter Kohlenstoffbrucke." J. Organomet. Chem., 401, C5. (1991).

J. A. Bandy et al. "Polymerisation of Ethylene and Propene using New Chiral Zirconium Derivatives. Crystal Structure of [ZrL1Cl2]–[H2L1=(4S,5S)–trans–4,5–bis(1H–inden–1–ylmethyl)–2,2–dimethyl–1,3–dioxolane]." J. Chem. Soc. Dalton Trans., 2207. (1991).

H. Lang. "4–ansa–Metallocene Complexes: Synthesis of 1,1,4,4–Tetramethyl–1,4–disilabutylene–Bridged Titanocene, Zirconocene, and Hafnocene Derivatives." Organometallics, 10, 347. (1991).

P. Burger et al. "ansa–Metallocene derivatives XXI. Syntheses of etheno–bridged ansa–titanocene derivatives by the McMurry reaction." J. Organomet. Chem. 407, 207. (1991).

W. Weng et al. "Bridged Bis(pentadienyl) Ligands: Conformationally Altered Open Metallocenes." Organometallics, 12, 1537. (1993).

B. Stempfle et al. "A Series of Bi– and Mono–Nuclear Ti(IV), Ti(III), and Ti(II) Complexes Containing the Dianion and Nonoanion of Bis(Cyclopentadienyl)Methane as Ligand(*)(**)." Gazzetta Chimica Italiana, 125, 287. (1995).

G. C. Hlatky et al. G. C. Hlatky et al. "Ionic, Base–Free Zirconocene Catalysts for Ethylene Polymerization." J. Am. Chem. Soc., 111, 2728. (1989).

W. J. Evans et al. "Reactivity of (C5Me5)xSm with Aryl–Substituted Alkenes: Synthesis and Structure of a Bimetallic Styrene Complex that Contains an eta2–Arene Lanthanide Interaction." J. Am. Chem. Soc., 112, 219. (1990).

P. J. Shapiro et al. "{eta5–C5Me4)Me2Si(etal–NCMe3)}(PMe3)ScH]2: A Unique Example of a Single–Component alpha–Olefin Polymerization Catalyst." Organometallics, 9, 867. (1990).

H. Yasuda et al. "Synthesis of Monodispersed High Molecular Weight Polymers and Isolation of an Organolanthanide (III) Intermediate Coordinated by a Penultimate Poly (MMA) Unit." J. Am. Chem. Soc. 114, 4908. (1992).

C. J. Schaverien. "Octaethylporphyrin*–Yttrium—Methyl Chemistry: Preparation and Selective Activation of Dioxygen by (oep)Y(mu–Me)2AlMe2." J. Chem. Soc. Chem. Commun., 458. (1991).

C. J. Schaverien. "Reactivity of [{Y(C5Me5)(OC6H3But2)(mu–H)}2] with Terminal Alkenes and Alkynes: A Model for the First Insertion Step in Alkene Polymerization." J. Chem. Soc., Chem. Commun., 11. (1992).

C. J. Schaverien et al. "Chemistry of (octaethylporphyrinato)lutetium and –yttrium Complexes: Synthesis and Reactivity of (OEP) MX Derivatives and the Selective Activation of O2 by (OEP)Y(mu–Me)2AlMe2." Inorg. Chem., 30, 4968. (1991).

H. Yasuda et al. "New Approach to Block Copolymerizations of Ethylene with Alkyl Methacrylates and Lactones by Unique Catalysis with Organolanthanide Complexes." Macromolecules, 25, 5115. (1992).

C. J. Schaverien. "Alkoxides as ancillary ligands in organolanthanide chemistry: synthesis, reactivity, alpha–olefin and diene polymerization by [Y(C5Me5)(OC5Ht3Bu2)(mu–H)]2." J. Molecular Catalysis, 90, 177. (1994).

H. Yasuda et al. "Synthesis of High Molecular Weight Poly(methyl methacrylate) with Extremely Low Polydispersity by the Unique Function of Organolanthanide(III) Complexes." Macromolecules, 26, 7134. (1993).

C. P. Casey et al. "Synthesis and Spectroscopic Characterization of the d0 Transition Metal—Alkyl—Alkene Complex Cp*2YCH2Ch2C(CH3)2CH=Ch2/." J. Am. Chem. Soc., 117, 9770. (1995).

W. P. Evans. "Heteropolyagostic Interactions in Lanthanide(III) Diissopropylamido Complexes." Inorg. Chem., 1995, 34, 5927. Inorg. Chem., 34, 5927. (1995).

C. J. Schaverien. "Alkoxides as Ancillary Ligands in Organolanthanide Chemistry: Synthesis of, Reactivity of, and Olefin Polymerization by the mu–Hydride–mu Alkyl Compounds [Y(C5Me5)(OC6H3tBu2)]2(mu–H)(mu–alkyl)." Organometallics, 13, 69. (1994).

W. J. Evans et al. "Field Desorption Mass Spectrometry Studies of the Samarium–Catalyzed Polymerization of Ethylene under Hydrogen." Macromolecules, 28, 7929. (1995).

C.Kreuder et al. "Early Metal Carborane Chemistry. Generation and Reactivity of (C5Me5)(mu5–C2B9H11))TiMe." J. Polymer Science, 33, 1125. (1995).

J. B. Nickaf et al. "Kinetics and Molecular Weights Distribution Study of Neodymium–Catalyzed Polymerization of 1,3–Butadiene." J. Polymer Science, 33, 1125. (1995).

H. Schumann et al. "Synthesis, Structure, and Reactivity of Organometallic pi–Complexes of the Rare Earths in the Oxidation State Ln3+ with Aromatic Ligands," Chem. Rev., 95, 865. (1995).

G. B. Deacon et al. "Complexes of lanthanoids with neutral pi donor ligands." J. Organomet. Chem., 506, 1. (1996).

G. B. Deacon et al. "Complexes of lanthanoids with neutral pi donor ligands." J. Organomet. Chem., 511, 1. (1996).

W. J. Evans et al. "Metalation as a Termination Step in Polymerization Reactions Involving alpha–Olefins and Ethylene as Detected by Field Desorption Mass Spectrometry." Organometallics, 15, 3210. (1996).

N. Fukuwatari. "Lanthanoid isopropoxide as a novel initiator for anionic polymerization of isocyanates." Macromol. Rapid Commun., 17, 1. (1996).

H. Adams et al. "Comparison of the Crystal and Molecular Structures of Cyclopentadienylbromodicarbonylruthenium(II) and (Ethyltetramethylcyclopentadienyl) bromodicarbonylruthenium(II)." Inorg. Chem., 22, 1155. (1983).

J. W. Bruno et al. "Organo–f–Element Thermochemistry. Metal–Ligand Bond Disruption Enthalpies in (Pentamethylcyclopentadienyl)thorium Hydrocarbyls, Metallacycles, Hydrides, and Dialkylamides." J. Am. Chem. Soc., 105, 6824. (1983).

J. W. Bruno et al. "New Stoichiometric and Catalytic Organometallic Chemistry with Actinides. C—H Activation and Phosphine/Phosphite Coordination Chemistry." Inorganica Chimica Acta, 94 271. (1984).

H. M. Colquhoun et al. "6 Organometallic Chemistry Part (I) The Transition Elements." 6 Organometallic Chemistry, 75, 97. (1978).

W. J. Evans et al. "Organolanthanide and Organoyttrium Hydride Chemistry. 5. Improved Synthesis of [(C5H4R)2YH(THF)]2 Complexes and Their Reactivity with Alkenes, Alkynes, 1,2–Propadiene, Nitriles, and Pyridine, Including Structural Characterization of an Alkylideneamido Pr." J. Am. Chem. Soc., 106, 1291. (1984).

A. J. Deeming et al. "10 Organometallic Chemistry." 10 Organometallic Chemistry, 75, 311. (1978).

W. J. Evans et al. "Catalytic Activation of Molecular Hydrogen in Alkyne Hyrogenation Reactions by Lanthanide Metal Vapor Reaction Product." J. Catalysis, 84, 468. (1980).

J. Holton et al. "Bridged Hydrocarbyl or Hydrocarbon Binuclear Transition–Metal Complexes: Classification, Structures, and Chemistry." Chem. Rev., 83, 135. (1980).

E. B. Lobkovskii et al. "The Crystal and Molecular Structure of the Complex of Yttrium Biscyclopentadienyl Chloride with Aluminium Hydride Monoetherate [eta5–C5H5)2YCL]2AlH3–OEt2." N. Organomet. Chem., 235, 151. (1982).

H. Schumann. "Organolanthanoid Compounds." Angew. Chem. Int. Ed. Engl., 23, 474. (1984).

K. Tabatabaian et al. "Carbonyl Substitution Reactions of cyclopentadienylbromodicarbonylruthenium(II) and (Ethyletetramethylcyclopentadienyl) bromodicarbonylruthenium(II). A Kinetic Study." Inorg. Chem., 20, 2020. (1981).

P. L. Watson. "(Pentamethylcyclopentadienyl)ytterbium and –lutetium Complexes by Metal Oxidation and Metathesis." Inorg. Chem. 20. (1981).

R. M. Manyik et al. "A Soluble Chromium–Based Catalyst for Ethylene Trimerization and Polymerization." J. Catalysis, 47, 197. (1977).

T. Xie et al. "Gas Phase Ethylene Polymerization: Production Processes, Polymer Properties, and Reactor Modeling." Ind. Eng. Chem. Res., 33, 449. (1994).

S. Koltzenburg. "The influence of methylalumoxane (MAO) on the isoselective propene polymerization with the homogeneous metallocene Me2Si(Benz[e]Ind)2ZrCl2." J. Molecular Catalysis, 116, 355. (1997).

J. Christoffers et al. "Catalytic Dimerization Reactions of alpha–Olefins and alpha, omega–Dienes with Cp2ZrCl2/Poly(methylalumoxane): Formation of Dimers, Carbocycles, and Oligomers." J. Am. Chem. Soc., 118, 4715. (1996).

S. Jüngling et al. "Propene Homo– and Copolymerization Using Homomgeneous and Supported Metallocene Catalysts Based on Me2Si(2–Me–Benz[3]Ind)2ZrCl2." J. Polymer Science, 35, 1. (1997).

R. Choukroun et al. "Redox Properties of Cationic Vanadium (IV): [Cp2VCH3(CH3Cn)][BPh4]." Organometallics, 14, 4471. (1995).

R. M. Pupi et al. "Structural Studies of Monocyclopentadienyl Titanium and Zironcium Complexes Containing a Diisopropylamide Ligand. Evidence of a beta–Agostic Interaction in (C5H5)M[N(iC3H7)2]Cl2." J. Organomet. Chem., 497, 17. (1995).

S. Jügling et al. "Propene Polymerization Using Homogenous MAO–Activated Metallocene Catalysts: Me2Si)Benz[e]Indenyl)2ZrCl2/MAO vs. Me2Si(2–Me–Benz[e]Indenyl)2ZrCl2/MAO." J. Polymeyer Science, 33, 1305. (1995).

S. Jügling et al. "The Influence of Methylalumoxane Concentration on Propene Polymerization with Homogeneous Metallocene–Based Ziegler–Natta Catalysts." J. Organomet. Chem., 497, 27. (1995).

R. J. Meier et al. "Ab Initio Molecular Dynamics Study of Metallocene–Catalyzed Ethylene Polymerization." J. Am. Chem. Soc., 116, 7274. (1994).

K. B. Sinclair et al. "Metallocene Catalysts: A Revolution in Olefin Polymerisation." Chemistry & Industry, Nov. 7, 1994. (1994).

S. Jüngling et al. "Cooperative Effects in Binuclear Zirconocenes: Their Synthesis and Use as Catalyst in Propene Polymerication." J. Organomet. Chem., 460, 191. (1993).

E. Siegbahn. "The Ziegler–Natta Olefin Insertion Reaction into a Metal–Alkyl Bond for Second–Row Transition Metal Atoms." Chemical Physics Letters, 250,290. (1993).

H. Kawamura–Kuribayashi et al. "An Ab Initio MO and MM Study of Homogeneous Olefin Polymerization with Silylene–Bridged Zirconocene Catalyst and Its Regio– and Stereoselectivity." J. Am. Chem. Soc., 114, 8687. (1992).

C. Ferero et al. "Effet of Protic Compounds on Ethylene Polymerization by Hf–Ti Supported Catalysts." Polymer, 34, 3514. (1993).

G. Ricci et al. "Polymerization of Conjugated Dialkenes with Transition Metal Catalysts. Influence of Methylaluminoxane on Catalyst Activity and Stereospecificity." Polymer commun., 32, 514. 91991).

J.C.W. Chien et al. "Olefin Copolymerization with Metallocene Catalysts. I. Comparison of Catalysts." J. Polymer Science, 29, 1585. (1991).

R.T. Carlin et al. "Complexation of Cp2MCl2 in a Chloroaluminate Molten Salt: Relevance to Homogeneous Ziegler–Natta Catalysis. J. Molecular Catalysis." 63, 125. (1990).

M.S. Erickson et al. "Stereoselectivity in the Synthesis of Tetramethylethano–Bridged 3,3'–di–tert–butylititanocene dichloride." J. Organomet. Chem., 415, 75. (1991).

D.G.H. Ballard et al. "Alkyl Bridged Complexes of the Group 3A and Lanthanoid Metals as Homogeneous Ethylene Polymerisation Catalysts." J.C.S. Chem. Comm., 7, 994. (1978).

S. Lasserre et al. "Cryoscopic Study and Vibrational Characterization of the Polyalumoxanes or Alumina Aggregates Formed During the Hydrolysis of Trimethyl–Aluminum in Benzene Solutions." Nouveau J. de Chimie, 7, 659. (1983).

M. Burzzone et al. "Influence of Catalysts on the Production Cost of Some Polyolefins and Polydiolefins, with Reference to New Catalysts Based on 4 and 5 f Group Elements of the Periodic Table." Inorganica Chimica Acta, 94, 291. (1984).

P. Pino et al. "Stereospecific Polymerization of Proylene: An Outlook 25 Years after Its Discovery." Angew, Chem. Int. Ed Engl., 19, 857. (1980).

H. Sinn et al. "Living Polymers on Polymerization with Extremely Productive Ziegler Catalysts." Angew Chem. Int. Ed. Engl., 5, 390. (1980).

G. Erker et al. "Die Bildung Chiraler Mono(eta5–cyclopentadienyl) zirconium(II)–Komplexe." Chem. Ber., 118, 1383. (1985).

T. Yano et al. "Soluble Magnesium–Titanium Catalysts for Ethylene Polymerization. I." J. Polymer Science, 23, 1455. (1985).

E. Lindner et al. "Unabhangige Mechanismen der Cyclotrimerisierung von Thiophosphinitomangan–Komoplexen mit Alkinen.—Ein Einfacher Zugang zu Funfgliedrigen Heterocyclen." Chem. Ber., 123, 783. (1990).

P. Rigollier et al. "Regioselective Cyclopentane Ring Formation Mediated by Titanocene Chloride." J. Am. Chem Soc., 112, 9441. (1990).

J.R. Young et al. "Stereoselective Formation of Dimethylcyclopentanes through Intramolecular Ziegler–Natta Alkene Insertion." Organometallics, 9, 3022. (1990).

R. Pearce et al. "6 Organometallic Chemistry Part (i) The Transition Elements." 6 Organometallic Chemistry, 73, 99. (1976).

Schut, J. "Extra Tough, New – Generation LLDPE Said to Mimic LDPE Proceesability." Plastics Technology, pp. 45–46. (Apr. 1993).

Dow Chemical. "Next Generation DOWLEX Resins Superior Properties and Cost Performance." Dow Chemical Company Brochure. (Jul. 1992).

PW News. "More' Muscular Wexene LLDPE Rolled Out by Mobil." Plastics World, pg 16. (1992).

Schut, J. "Tough New Hexene Copolymer LLDPE." Plastics Technology, p. 39. (1992).

Leaversuch, R. "Technoscope—Unipol 2 Technology Is Claimed to Boost Downgaging in LLPDE Films." Modern Plastics, p. 26. (Apr., 1993).

Crotty, V et al. (Feb. 21–24, 1993) "Properties of Super Strength Hexene Film Resin." Presented at the Polyolefins VII International Conference, Houston, Texas, pp. 192–214. (Feb. 21, 1993).

Speed, C.S. et al. (Feb. 24–27, 1991) "Structure/Property Relationships in Exxpol™ Polymers." Presented at Society of Plastics Engineers Polyolefins VII International Conference, Houston, Texas. (Feb. 24, 1991).

Schwank, G.D. (Sep. 23, 1992) "Selected Applications for Constrained Geometry Catalyst Technology (CGCT) Polymers." Presented at SPO '92. (Sep. 23, 1992).

Soga & Shiono. "Isotactic polymerization of propene with (n–1, 1'–ethylenedi–4,5,6,7–tetrahydroindenyl) zirconium dichloride combined with methylaluminoxane." Makromol. Chem. Rapid Commun. 8, No. 6, pp. 305–310 (Jun. 1987).

Billmeyer, F. W. "Thermal Analysis, Part 1—Polymer Chains and Their Characterization." Textbook of Polymer Science 2nd Edition (Chapter 4, Section E), pp. 120–121. (1971).

Trudell, B.C. et al. "Single Site Catalyzed Ethylene Copolymers: Structure/Property Relationships." Antec. (1992).

Hockey. "The Surface Properties of Silica Powders." Chemistry & Industry, pp. 57–63. (1965).

Iler. "The Chemistry of Silica—Chapter 6 'The Surface Chemisrty of Silica.'" The Chemisrty of Silica, pp. 622–729. (1979).

Crotty et al. "Properties of Super Strength Hexene Film Resins." Presntation—Mobil Chemical Company Edison Research Laboratory. (Undated).

Furtek. "Ultra Strength Polyethylene Resins Produced in a Fluidized–Bed Process Utilizing Metallocene–Based Catalysts." Presentation MetCon 93 Houston, Texas 1993. (May 26, 1993).

1980, Kaminsky, Walter, et al. "Living Polymers On Polymerization with Extremely Productive Ziegler Catalysts", Agnew. Chem. Int. Ed. Engl. 19, pp. 390–392 No. 19, (1980).

1984, Kaminsky, Walter, et al. "Influence of Hydrogen on the Polymerization of Ethylene with the Homogeneous Ziegler System Bis(cyclopentadienyl)zirconiumdichloride/ aluminoxane" Makromol. Chem., 225—225 (1984) vol. 5.

1987, Kaminsky, Walter, et al. "Isotactic Polymerization of Propene with (n–1, 1'–ethylenedi–4,5,,6,7–tetrahydroindenyl)zirconium dichloride Combined with Methylaluminoxane" Malromol. Chem. Rapid Commun., 8, 305–310 (1987).

1983, Kaminsky, Walter, et al. "Bix(cyclopentadienyl)zirkon–Verbindungen and Aluminoxan als Ziegler––Katalysatoren fur die Polymersation und Copolymerisation von Olefinen", Malromol. Chem., Rapid Commun., 4, 417–421 (1983).

1980, Dissertation of A. Andresen with Translation. UV spektoskopische Untersuchungen . . . als Katalvsatorkompohente, U. of Hamburg.

1985, Dissertation of K. Hahnsen with Translation. "Kinetische und mechanistische . . . und Methylaluminoxan" U. of Hamburg.

1979, J. Herwig Dissertation with Translation Enclosed. "Olefinpolymerisation mit loslichen . . . Aluminiumalkylkomponente" U. of Hamburg.

1985, Dissertation of K. Kulper with Translation. "Polymerissationsverhalten von loslichen . . . gegenuber 1–Olefinen" U. of Hamburg.

1981, Diplomarbeit of K. Kulper with Translation. "Homogene. Chlorhaltige . . . von(CpMe5)2ZrCl2 . . . von Cp2ZrCl2 . . . von Ethen" U. of Hamburg.

Kaminsky et al, Angew, Chem. Int. Ed. Engl. vol. 15 (1976) p. 629–630.

PCT International Search Report, Oct. 22, 1998 (mailed) PCT/US98/13690.

PREPARATION OF SUPPORTED CATALYST USING TRIALKYLALUMINUM-METALLOCENE CONTACT PRODUCTS

FIELD OF THE INVENTION

The invention relates to new catalyst compositions. In particular, the invention relates to supported metallocene catalysts and new methods of their synthesis.

BACKGROUND OF THE INVENTION

Metallocene catalysts, activated by alumoxanes, were introduced to the art of catalysis in the late 1970s. The efforts to maximize their efficacy have led to various unique developments. Because of the initial problems involving alumoxanes, some of the developments involved different techniques for producing the cocatalyst (or activator) and to alternatives of activating metallocene complexes.

SUMMARY OF THE INVENTION

The invention relates to a supported (heterogeneous) catalyst. The catalyst takes the form of particles which are free flowing and comprise a fully activated, single-component metallocene catalyst.

The supported catalyst is a contact product comprising components (A) and (B). Component (A) is the contact product of silica containing hydroxyl groups and alumoxane. The molar ratio of hydroxyl groups on the silica surface to aluminum provided by alumoxane ranges from 0.01 to 1.50. Component (B) is the contact product of a metallocene compound of transition metal and a trialkyaluminum compound; the contact product of (B) is soluble in a paraffinic hydrocarbon containing at least 5 carbon atoms. The transition metal compound has the formula $Cp_xM(R^1)_y(R^2)_z$, wherein Cp is a cyclopentadienyl group, unsubstituted or substituted, x is 1 or 2; M is zirconium, hafnium, or titanium; each of $R^1$ and $R^2$ is selected from the group consisting of a halogen atom, a hydrogen atom, and an alkyl group, providing that x+y+z is equal to the valence of the M; the trialkylaluminum compound in the contact product (B) is characterized by the formula $Al(R^3)_a(R^4)_b(R^5)_c$ wherein each of $R^3$, $R^4$, and $R^5$ is a straight-chain or branched alkyl group containing 1 to 10 carbon atoms, wherein $R^3$, $R^4$, and $R^5$ are the same or different, and wherein the sum of a+b+c is equal to 3. The metallocene transition metal compound per se is not very soluble in said paraffinic hydrocarbon and the transition metal compound derivatives affixed to said support are not soluble in the paraffinic hydrocarbon.

The invention also comprises a process for preparing a catalyst composition comprising providing silica which has been dehydrated at temperatures ranging from 200° to 750° C.; contacting said silica with an amount of alumoxane; impregnating the contact product with a solution of an intermediate which has been formed by contacting a metallocene compound of a transition metal with a trialkylaluminum compound in a paraffinic hydrocarbon which is a solvent for the intermediate and in which the transition metal compound itself is not very soluble, wherein the transition metal compound has the formula $Cp_xM(R^y)_y(R^2)_2$ in which the Cp, x, M, $R^1$, $R^2$ x+y+z are defined as above; and recovering a supported catalyst in which M and derivatives thereof are fixed to the silica and are insoluble in said hydrocarbon.

DETAILED DESCRIPTION OF THE INVENTION

The catalyst of the invention is a supported (heterogeneous) catalyst and comprises 0.05 to 2.00 weight percent (wt. %), preferably 0.10 to 0.60 wt. % of a transition metal provided by a metallocene compound of a transition metal of the formula $Cp_xM(R^1)_y(R^2)_2$. The catalyst comprises two sources of aluminum. It is characterized by a total aluminum content of 5 to 20 wt. %, preferably 8 to 15 wt. % of aluminum which refers to the total aluminum content provided by both a trialkylaluminum compound and an alumoxane. (The foregoing weight percents are based on the combined weight of support and metals).

The catalyst comprises a contact product, and derivatives thereof, of an alumoxane and the support, silica or silica/alumina, or alumina. The catalyst composition of the invention can be characterized as the contact product of components (A) and (B), wherein:

component (A) is the contact product of a support, such as silica containing hydroxyl groups, and an alumoxane; and, component (B) is the contact product of a metallocene compound of a transition metal and an alkylaluminum compound such as a trialkylaluminum compound.

The support for the catalyst may be any carrier material which contains surface hydroxyl groups.

The preferred carrier material for the catalyst is a solid, particulate, porous, inorganic material, such as an oxide of silicon and/or of aluminum. The carrier material is used in the form of a dry powder having an average particle size of from about 1 micron to about 500 microns. The surface area of the carrier is at least about 3 $m^2$/g, and preferably from at least 50 $m^2$/g up to 350 $m^2$/g. The carrier material should be dry, that is, free of absorbed water. Drying of the carrier material can be effected by heating at about 100° C. to about 1000° C. When the carrier is silica, it is heated to at least 200° C., preferably about 200° C. to about 850° C., and most preferably at about 600° C. The number of hydroxyl groups (silanol groups in the case of silica) is inversely proportional to the temperature of dehydration: the higher the temperature the lower the hydroxyl content. The carrier material must have at least some active hydroxyl (OH) groups on its surface to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 millimoles per gram (mmol/g). The silica of the most preferred embodiment is a high surface area, amorphous silica (surface area=300 $m^2$/g; pore volume of 1.65 $cm^3$/g), and it is a material marketed under the tradenames of Davison 952 or Davison 955 by the Davison Chemical Division of W. R. Grace and Company or Crosfield ES70 by Crosfield Limited. The silica is in the form of spherical particles, which are obtained by a spray-drying process. As procured, these silicas are not calcined and thus must be dehydrated as indicated above.

Alumoxane is a class of oligomers which includes methylalumoxane. Methylalumoxane (MAO) is used as a cocatalyst with metallocene catalysts. The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—)O—)$_m$ for oligomeric cyclic alumoxanes wherein n is 1–40, preferably 10–20, m is 3–40, preferably 3–20 and R is a $C_1$–$C_8$ alkyl group or mixtures thereof, preferably a methyl group. MAO is a mixture of oligomers with a very wide distribution of molecular weights and usually with an average molecular weight of about 1200. MAO is commonly produced by reacting trimethylaluminum with water or with hydrated inorganic salts. MAO is a solid and is typically kept in solution in toluene.

Contact of the alumoxane with the support results in a reaction product of the alumoxane and the support. When the support is silica, the contact product, which can be termed an aluminosilicate, is formed. The reaction between the support and the alumoxane occurs via hydroxyl groups of the support; thus, if the support is silica, the reaction occurs via silanol groups. Confirmation of the formation of this unique product resides in two additional independent sources of evidence. First, after contact with the support, the alumoxane cannot be extracted off of the support with toluene. Second, NMR [nuclear magnetic resonance] spectrum of the product shows that a signal unique to alumoxane per se disappears after the support is contacted with the alumoxane.

Contact of the support with alumoxane is undertaken at a −10° C. to 80° C. temperature range and at ambient pressure. The contact can be undertaken in several steps. The amount of alumoxane relative to a support is controlled by the available hydroxyl groups on the support or by the amount of deposition of alumoxane required. Typically, the amount of alumoxane is 2–10 mmol/g support, preferably 4 to 8 mmol/g support. This catalyst synthesis step is undertaken under inert conditions, in the absence of water and oxygen.

In one embodiment of the invention, the support is contacted with a solution of the alumoxane provided as a volume which is equal to the pore volume of the support, so that no slurry of the support is formed during the alumoxane/support contact step. Although the presently preferred solvent is toluene, it can also be another aromatic hydrocarbon or an aliphatic hydrocarbon.

In a second embodiment of contacting the support with alumoxane, the support is used as a slurry in a paraffinic hydrocarbon. In the slurry embodiment of making the alumoxane/support contact product, a solvent system is used which effects the contact and allows the reaction of the support and an alumoxane. In this second embodiment of alumoxane/support contact, the total volume of the liquid medium is greater than the pore volume of the support. The solvent may be a straight-chain or branched alkane containing 5 to 15 carbon atoms selected from the group of isohexane, hexane, heptane or isopentane.

The support is dispersed therein to form a slurry. The total solvent system in this case may include one hydrocarbon solvent of 5 to 15 carbon atoms or at least two hydrocarbon solvents; in the latter instance, the solvents may be miscible and one of them may constitute a solvent for the alumoxane, while the second solvent may be a non-solvent for the alumoxane. Solvents for the alumoxane include aromatic and aliphatic hydrocarbons, preferably toluene. All solvents should be purified, such as by percolation through silica gel and/or molecular sieves to remove traces of water, oxygen, polar compounds, and other materials capable of adversely affecting catalyst activity.

No isolation of the contact product (A) of a support and an alumoxane is required for depositing or impregnating the transition metal derivative into the contact product. However, isolation of the support-alumoxane contact product (A) is also possible. In the embodiments given below, the transition metal complex is added directly to the support-alumoxane contact product (A), in situ.

The transition-metal metallocene complex is deposited or impregnated into the contact product (A) as a contact product (B) of an alkylaluminum compound and the metallocene complex. Deposition or impregnation of the contact product (A) of a support and an alumoxane with the contact product (B) comprising a transition metal derivative results in the formation of a new contact product; this statement includes a possibility of a chemical reaction between the support-alumoxane contact product (A) and the transition-metal metallocene complex.

The transition-metal metallocene compound has the formula $Cp_xM(R^1)_y(R^2)_2$. This metallocene compound is preliminarily contacted with an alkylaluminum compound, preferably a trialkylaluminum compound. Metallocene compounds, although not very soluble in paraffins, can be readily dissolved in them in the presence of a trialkylaluminum compound. The dissolved transition metal compound is believed to be a unique chemical entity as metallocene compounds, absent the alkyaluminum, are not very soluble in hydrocarbon solvents. The alkylaluminum compound: metallocene ratios correspond to molar ratios of 1 to 100, preferably 5 to 50. Furthermore, the molar ratio of the aluminum, provided by the alumoxane, to the transition metal in the metallocene complex ranges from 50 to 500, preferably 100 to 300. Contact of these two components, a metallocene complex and a trialkylaluminum compound, is undertaken in a paraffinic hydrocarbon solvent such as straight-chain or branched alkanes containing at least 5 carbon atoms and exemplified by pentane, isopentane, hexane, isohexane, n-heptane, and isoheptane.

The alkylaluminum compound, preferably a trialkylaluminum compound, which is contacted with the metallocene compound, is characterized by the formula $Al(R^3)_a(R^4)_b(R^5)_c$, wherein each of $R^3$, $R^4$, and $R^5$ is an alkyl group, (straight-chain or branched), or a halogen atom, but is preferably an alkyl group containing 1 to 10 carbon atoms; and each of $R^3$, $R^4$, and $R^5$ is the same or different. The alkyl groups can be methyl, ethyl, propyl, isopropyl, butyl, isobutyl, pentyl, isopentyl, hexyl, isohexyl, heptyl, isoheptyl, octyl, or isooctyl. Most preferably, this component is trimethylaluminum (TMA). The alkylaluminum compound, preferably trialkylaluminum compound, is contacted with the metallocene compound in the absence of alumoxane. This statement means that any product realized by the contact of the metallocene compound and a trialkylaluminum compound does not involve water and/or an alumoxane.

The metallocene compound has the formula $Cp_xM(R^1)_y(R^2)_z$ in which Cp is an unsubstituted or substituted cyclopentadienyl group, M is a zirconium, hafnium or titanium atom and $R^1$ and $R^2$ belong to the group including a halogen atom, a hydrogen atom or an alkyl group. In the above formula of the metallocene compound, the preferred transition metal atom M is zirconium. In the above formula of the metallocene compound, the Cp group is an unsubstituted, a mono-, a di-substituted, a tri-substituted or a polysubstituted cyclopentadienyl group: and x is at least 1 and preferably is 2. The substituents on the cyclopentadienyl group can be preferably straight-chain $C_1$–$C_6$ alkyl groups. The cyclopentadienyl group can also be a part of a bicyclic or a tricyclic moiety such as indenyl, tetrahydroindenyl, fluorenyl or a partially hydrogenated indenyl or fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$, —CR'R"— and —CR'R"—CR'R"— where R' and R" are short chain alkyl groups or hydrogen atoms, —$Si(CH_3)_2$—, —$Si(CH_3)_2$—$CH_2$—$CH_2$—$Si(CH_3)_2$—, and similar bridge groups. If the $R^1$ and $R^2$ substituents in the above formula of the metallocene compound are halogen atoms, they belong to the group of fluorine, chlorine, bromine or iodine; and y+z is 3 or less, provided that x+y+z equals the valence of M. If the substituents $R^1$ and $R^2$ in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include:
bis(cyclopentadienyl)metal dihalides,
bis(cyclopentadienyl)metal hydridohalides,
bis(cyclopentadienyl)metal monoalkyl monohalides,
bis(cyclopentadienyl)metal dialkyls and bis(indenyl)metal dihalides wherein the metal is a zirconium, hafnium or titanium atom; halide groups are preferably chlorine atoms and the alkyl groups are $C_1$–$C_6$ alkyls. Illustrative but non-limiting examples of metallocenes include
bis(cyclopentadienyl)zirconium dichloride,
bis(cyclopentadienyl)hafnium dichloride,
bis(cyclopentadienyl)titanium dichloride,
bis(cyclopentadienyl)zirconium dimethyl,
bis(cyclopentadienyl)hafnium dimethyl,
bis(cyclopentadienyl)zirconium hydridochloride,
bis(cyclopentadienyl)hafnium hydridochloride,
bis(n-butylcyclopentadienyl)zirconium dichloride {(n-BuCp$_2$ZrCl$_2$},
bis(n-butylcyclopentadienyl)hafnium dichloride,
bis(n-butylcyclopentadienyl)zirconium dimethyl,
bis(n-butylcyclopentadienyl)hafnium dimethyl,
bis(n-butylcyclopentadienyl)zirconium hydridochloride,
bis(n-butylcyclopentadienyl)hafnium hydridochloride,
bis(1,3-dimethylcyclopentadienyl)zirconium dichloride,
ethylenebis(1-indenyl)zirconium dichloride,
bis(pentamethylcyclopentadienyl)hafnium dichloride,
cyclopentadienylzirconium trichloride,
bis(indenyl)zirconium dichloride,
bis(4,5,6,7-tetrahydro-indenyl)zirconium dichloride, and
ethylene[bis(4,5,6,7-tetrahydro-1-indenyl )]zirconium dichloride.

As an example, the contact product (B) of the invention may be prepared using (n-BuCp)$_2$ZrCl$_2$ and TMA.

After mixing contact products (A) and (B), to form the final contact product, excess solvent is removed by evaporation at an elevated temperature. In the process, the soluble metallocene-containing contact product (B) becomes affixed to the contact product (A). It is thereafter insoluble in same solvent system which was used to prepare the final contact product. Preferably the drying temperature is below 90° C. and more preferably it is below 60° C.

The dried catalyst of this invention exists in a particulate form. It can be fed to a gas-phase fluidized-bed reactor or to a slurry reactor for polymerization and copolymerization of ethylene in the absence of an additional alumoxane.

The temperature of polymerization can range from 25° to 125° C., but more generally between 50° and 115° C., at pressures of less than 1000 psi.

The catalyst can be used to produce high density polyethylene but it is most commercially valuable for the production of linear low density polyethylene (LLDPE) resins in a particulate form. The LLDPE copolymers of ethylene and 1-olefins contain at least 80 wt. % ethylene and less than 20 wt. % of an alpha-olefin of 3 to 10 carbon atoms, preferably of 4 to 10 carbon atoms, including propylene, 1-butene, 1-pentene, 1-hexene, 4-methyl-1-pentene, and 1-octene. These LLDPE products exhibit MFR values [$I_{21.6}$/$I_{2.16}$ ratios, each of which is measured according to ASTM D-1238, Conditions F and E] of less than 25.

EXAMPLES

Example 1

Into a three-necked flask was added Davison-grade 955 silica (2.50 g) which was previously calcined at 600° C. for 4 hours. The dry silica bed was stirred and, at ambient temperature, methylalumoxane (MAO) solution in toluene (12.50 mmol, about 3 ml) was added to it in a period of 12 minutes. The liquid was completely absorbed inside the silica pores. After stirring the solid bed for about 40 minutes, isohexane (about 100 ml) was added to it and the slurry was stirred for about 25 minutes. Separately, a heptane solution of a zirconocene complex was prepared by reacting trimethylaluminum (TMA) (2.50 mmol) in heptane solution (about 2 ml) with (n-BuCp$_2$)ZrCl$_2$ (0.0625 mmol, 0.0253 g). This solution was added to the above silica-MAO slurry at an ambient temperature. After stirring the mixture at ambient temperature for about 45 minutes, the solvents were removed by evaporation at about 50° C. under a nitrogen flow to yield a pale-yellow, free-flowing powder.

Example 2

Into a three-necked flask was added Davison-grade 955 silica (2.50 g) which was previously calcined at 600° C. for 4 hours, followed by isohexane (100 ml). To this stirred slurry at ambient temperature was added MAO solution in toluene (12.50 mmol, about 3 ml). The mixture was stirred for 80 minutes at ambient temperature. Separately, a heptane solution of a zirconocene complex was prepared by reacting TMA (2.50 mmol) in heptane solution (about 2 ml) with (n-BuCp$_2$)ZrCl$_2$ (0.0625 mmol, 0.0253 g). This solution was added to the above asilica-MAO mixture at ambient temperature. After stirring the mixture at ambient temperature for about 45 minutes, the solvents were removed by evaporation at about 50° C. under a nitrogen flow to yield a pale-yellow, free-flowing powder.

Example 3

Into a three-necked flask was added Davison-grade 955 silica (2.50 g) which was previously calcined at 600° C. for 4 hours. To this stirred silica bed at ambient temperature was added MAO solution in toluene (12.50 mmol, about 3 ml) in a period of 6 minutes. The liquid was completely absorbed inside the silica pores. The solid bed was stirred for about 120 minutes. Separately, a heptane solution of a zirconocene complex was prepared by reacting TMA (2.50 mmol) in heptane solution (about 2 ml) with (n-BuCp$_2$)ZrCl$_2$ (0.0625 mmol, 0.0253 g). This solution was added to the above solid silica-MAO bed at an ambient temperature in a period of 6 minutes. All the heptane solution was absorbed inside the silica pores. After stirring the mixture at ambient temperature for about 30 minutes, it was heated at about 50° C. under a nitrogen flow to yield a pale-yellow, free-flowing powder.

Example 4

Same as Example 2 except 17.50 mmol MAO and 0.0875 mmol (0.0354 g) of (n-BuCp$_2$)ZrCl$_2$ were used.

Slurry Polymerization Reactions

Ethylene/1-hexene copolymers were prepared using catalysts of Examples 1–4 and an additional amount of a trialkylaluminum compound as an impurity scavenger. An example is given below.

A 1.6-liter stainless-steel autoclave equipped with a magnet-drive impeller stirrer was filled with heptane (750 ml) and 1-hexene (165 ml) under a slow nitrogen purge at 50° C., and then 2.0 mmol of triethylaluminum was added to the reactor. The stirring was increased to 1000 rpm, and the temperature was increased to 75° C. Then ethylene was introduced to maintain the total pressure at about 210 psig. Finally, 35.8 mg of the catalyst of Example 1 was introduced into the reactor with ethylene over-pressure, and the temperature was held at 75° C. The polymerization reaction was carried out for one hour and then the ethylene supply was stopped. The reactor was cooled to an ambient temperature and the polyethylene was collected.

The slurry polymerization results are given below:

| Catalyst | Productivity g/gh | Melt Index | MFR | Mole % hexene in copolymer |
| --- | --- | --- | --- | --- |
| Example 1 | 2410 | 1.18 | 18.1 | 1.90 |
| Example 2 | 2710 | 1.18 | 17.9 | 2.15 |
| Example 3 | 1630 | 0.54 | 16.9 | 1.90 |
| Example 4 | 3330 | 0.91 | 17.7 | 2.25 |

The data show that the new catalyst systems are highly active. As described above, the supported catalysts can be prepared either in the presence or in the absence of a saturated hydrocarbon during preparation of contact product (A), although higher productivities are obtained when a saturated hydrocarbon is employed in the preparative scheme (compare Examples 1 and 3 with Examples 2 and 4).

Thus it is apparent that there has been provided, in accordance with the invention, a synthesis that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A single-component contact product for homopolymerization of ethylene or copolymerization of ethylene and alpha-olefins, consisting of components (A) and (B), wherein component (A) is the contact product of silica containing hydroxyl groups and an alumoxane, wherein the molar ratio of hydroxyl groups in silica to aluminum in the alumoxane, ranges from 0.01 to 1.50; and component (B) is the contact product (B) of a metallocene compound of a transition metal and a trialkylaluminum compound, wherein said contact product (B) is soluble in paraffinic hydrocarbons containing at least 5 carbon atoms, wherein the metallocene transition metal compound has the formula $Cp_xM(R^1)_y(R^2)_z$ wherein Cp is a cyclopentadienyl group, unsubstituted or substituted, or part of a bicyclic or tricyclic moiety, x is 1 or 2, or when x equals 2, the cyclopentadienyl groups can be bridged, M is zirconium, hafnium, or titanium; each of $R^1$ and $R^2$ is selected from the group consisting of a halogen atom, a hydrogen atom, and an alkyl group providing that x+y+z is equal to the valence of M;

wherein the trialkylaluminum compound in said contact product (B) is characterized by the formula $Al(R^3)_a$ $(R^4)_b(R^5)_c$ wherein each of $R^3$, $R^4$, and $R^5$ is a straight-chain or branched alkyl group containing 1 to 10 carbon atoms, wherein $R^3$, $R^4$, and $R^5$ are the same or different, and wherein the sum of a+b+c is 3 and wherein said component (A) is contacted with said component (B).

2. The single component contact product of claim 1, wherein the cyclopentadienyl is a substituted cyclopentadienyl and is substituted by at least one alkyl group containing 1 to 10 carbon atoms.

3. The single component contact product of claim 1, wherein $R^1$ and $R^2$ are the same.

4. The single component contact product of claim 1, wherein the cyclopentadienyl is provided by a group which is a fused ring containing 9 to 16 carbon atoms.

5. The single component contact product of claim 4, wherein the group which is a fused ring is indenyl.

6. The single component contact product of claim 2 wherein the alkyl of the substituted cyclopentadienyl is selected from the group consisting of methyl, ethyl, propyl, butyl, isobutyl, pentyl and isopentyl.

7. The single component contact product of claim 6 wherein x is 2 and Cp is butylcyclopentadienyl.

8. The single component contact product of claim 7, wherein $R^1$ and $R^2$ are chlorine.

9. A process for preparing a catalyst composition consisting of the steps of providing silica which has been dehydrated at temperatures ranging from 200° to 750° C., contacting said silica with an amount of an alumoxane; wherein the molar ratio of hydroxyl groups in said silica aluminum in said alumoxane ranges from 0.01 to 1.50; impregnating said silica with a solution of an intermediate which has been formed by contacting a transition metal compound with a trialkylaluminum compound to form a contact product (B), in a hydrocarbon which is a solvent for the contact product and in which the transition metal compound is insoluble, wherein the transition metal compound has the formula $Cp_xM(R^1)_y(R^2)_a$ wherein Cp is cyclopentadienyl, unsubsituted or substituted, x is 1 or 2, M is zirconium, hafnium, or titanium; each of $R^1$ and $R^2$ is selected from the group consisting of a halogen atom, a hydrogen atom, and an alkyl group providing that x+y+z is equal to the valence of the M; and wherein the trialkylaluminum provided for the contact product (B) is characterized by the formula $Al(R^3)_a$ $(R^4)_b(R^5)_c$ wherein each of $R^3$, $R^4$, and $R^5$ is a straight-chain or branched alkyl group containing 1 to 10 carbon atoms, wherein $R^3$, $R^4$, and $R^5$ are the same or different, and wherein the sum of a+b+c is 3; and, wherein Al is aluminum; and recovering a supported catalyst in which M and derivatives thereof are fixed to the silica and M and its derivatives are insoluble in said hydrocarbon.

10. The process of claim 9, wherein the transition metal compound is introduced into said hydrocarbon which is a paraffin containing 5 to 15 carbon atoms in which said transition metal compound is insoluble; adding to said hydrocarbon an amount of trimethylaluminum or triethylaluminum, said amount being sufficient to produce a solution.

11. The process of claim 10, wherein said hydrocarbon is isopentane, hexane, isohexane, heptane, isoheptane or admixtures thereof.

* * * * *